United States Patent Office 3,338,142
Patented Aug. 29, 1967

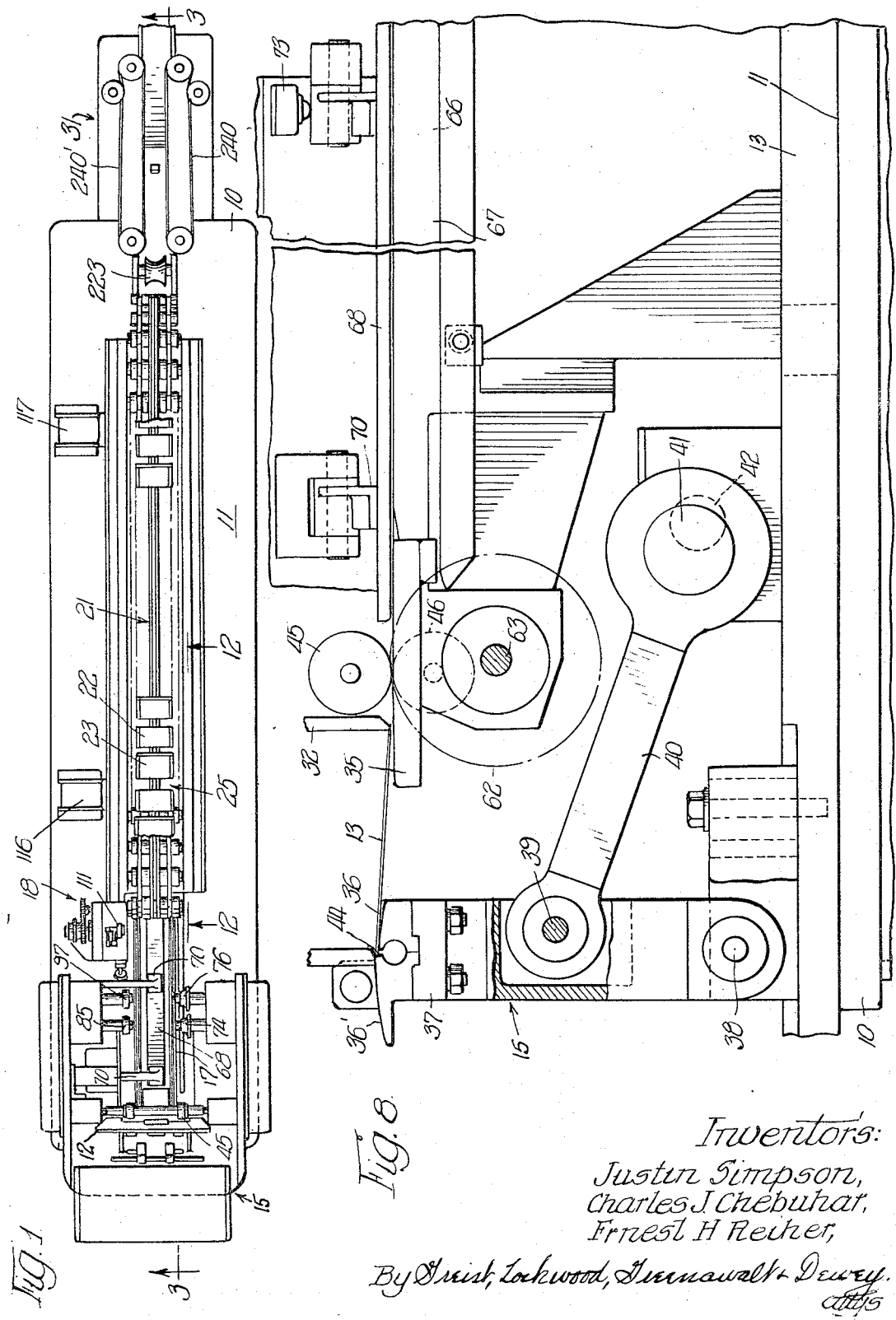

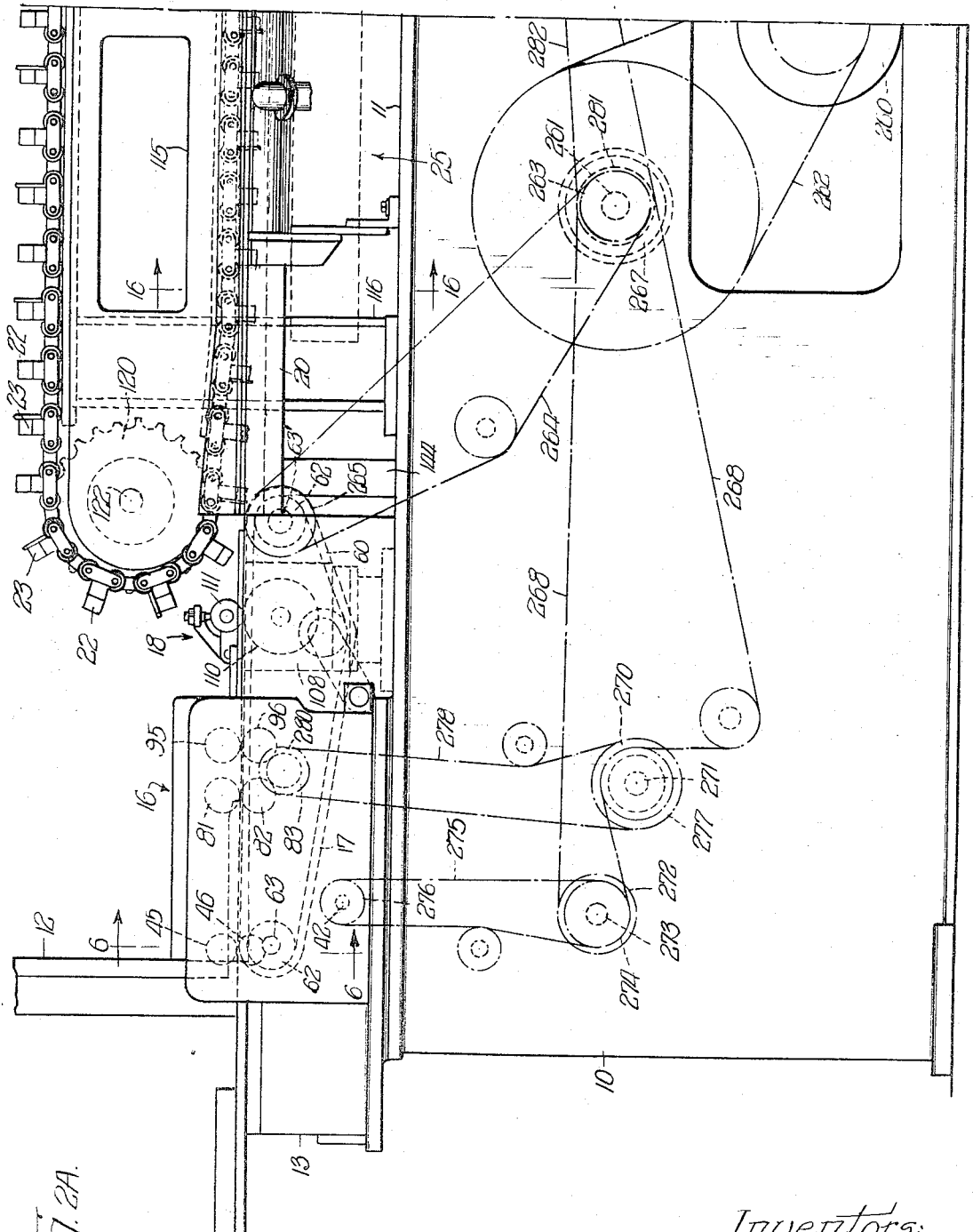

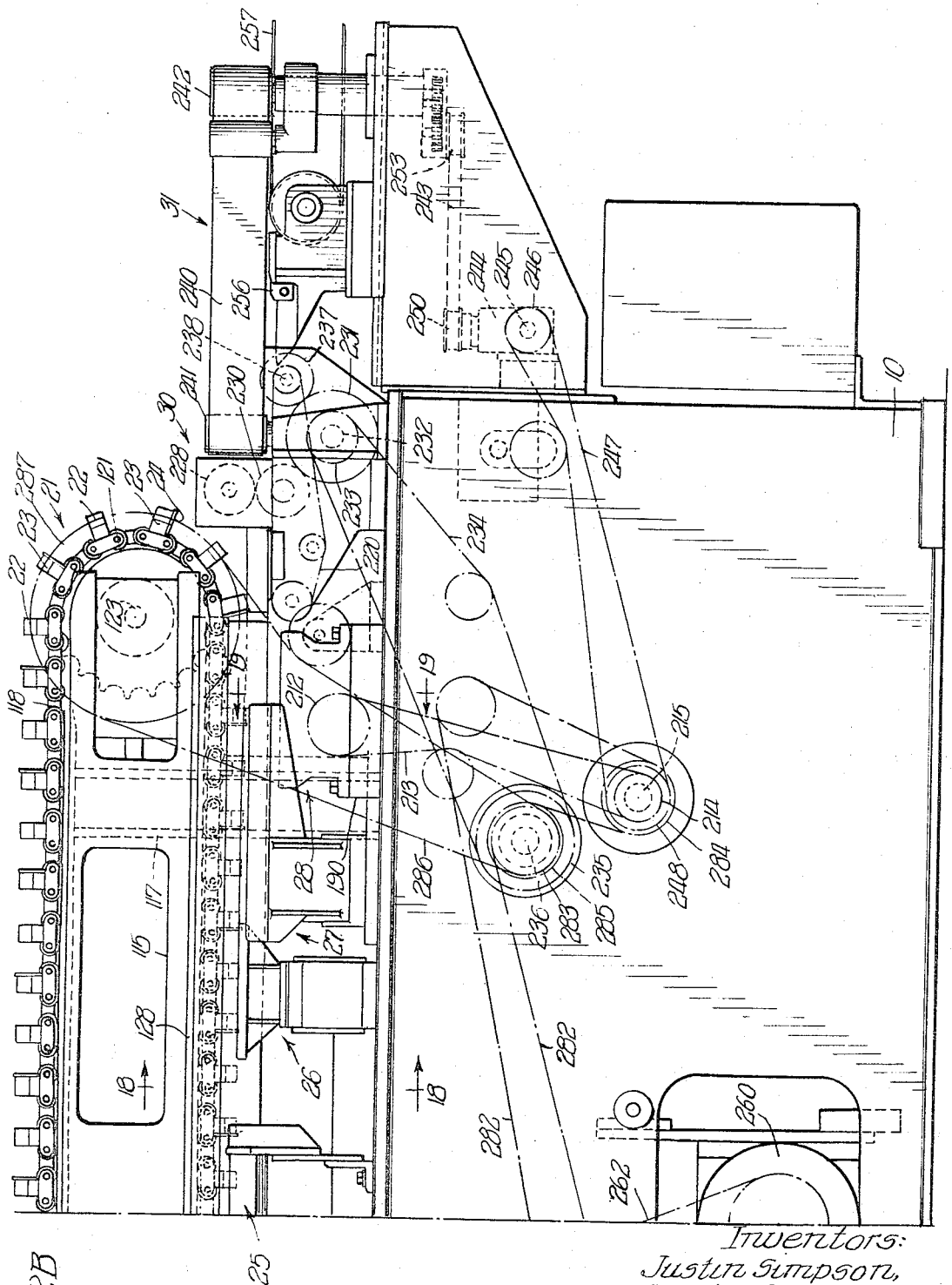

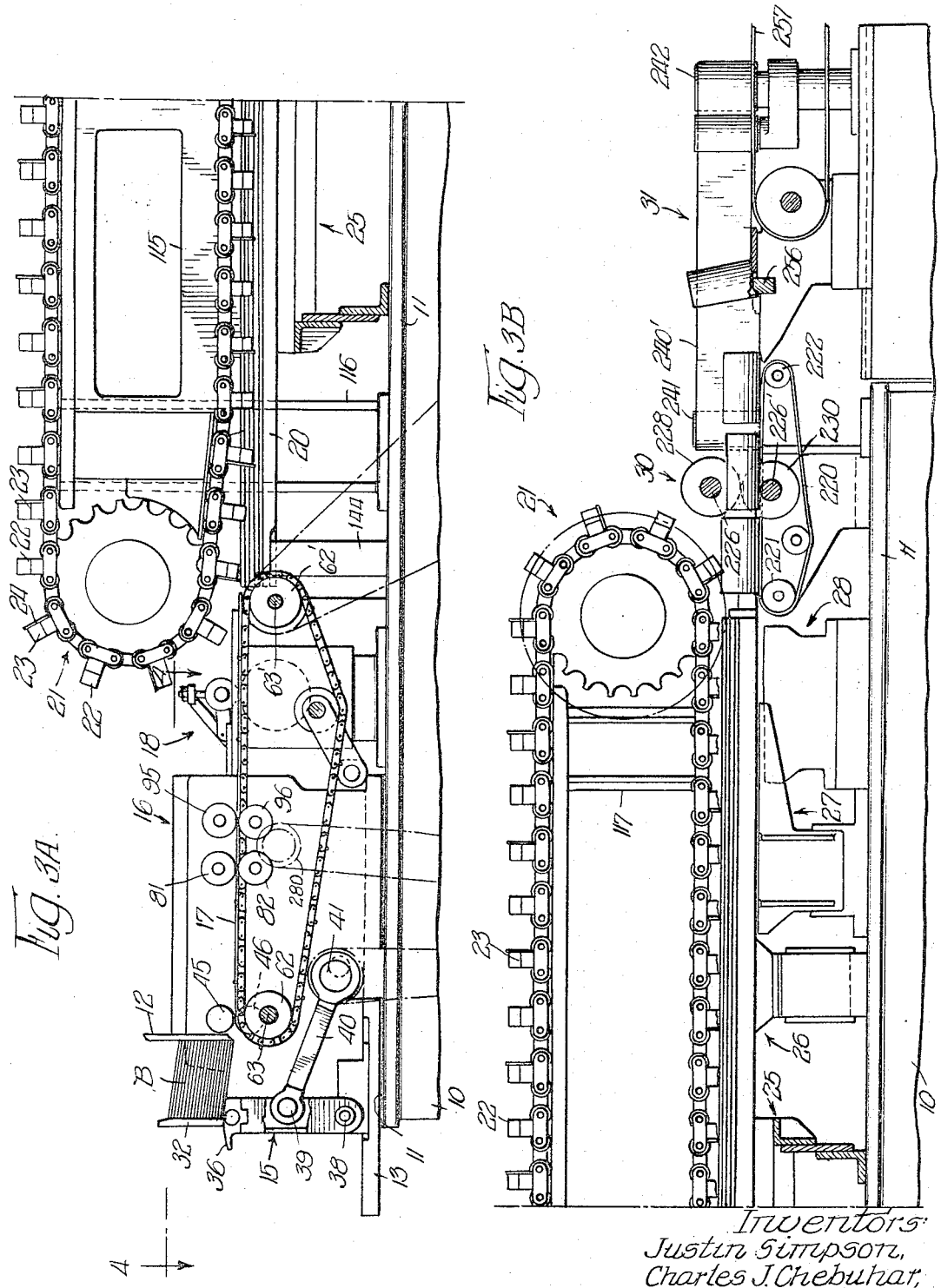

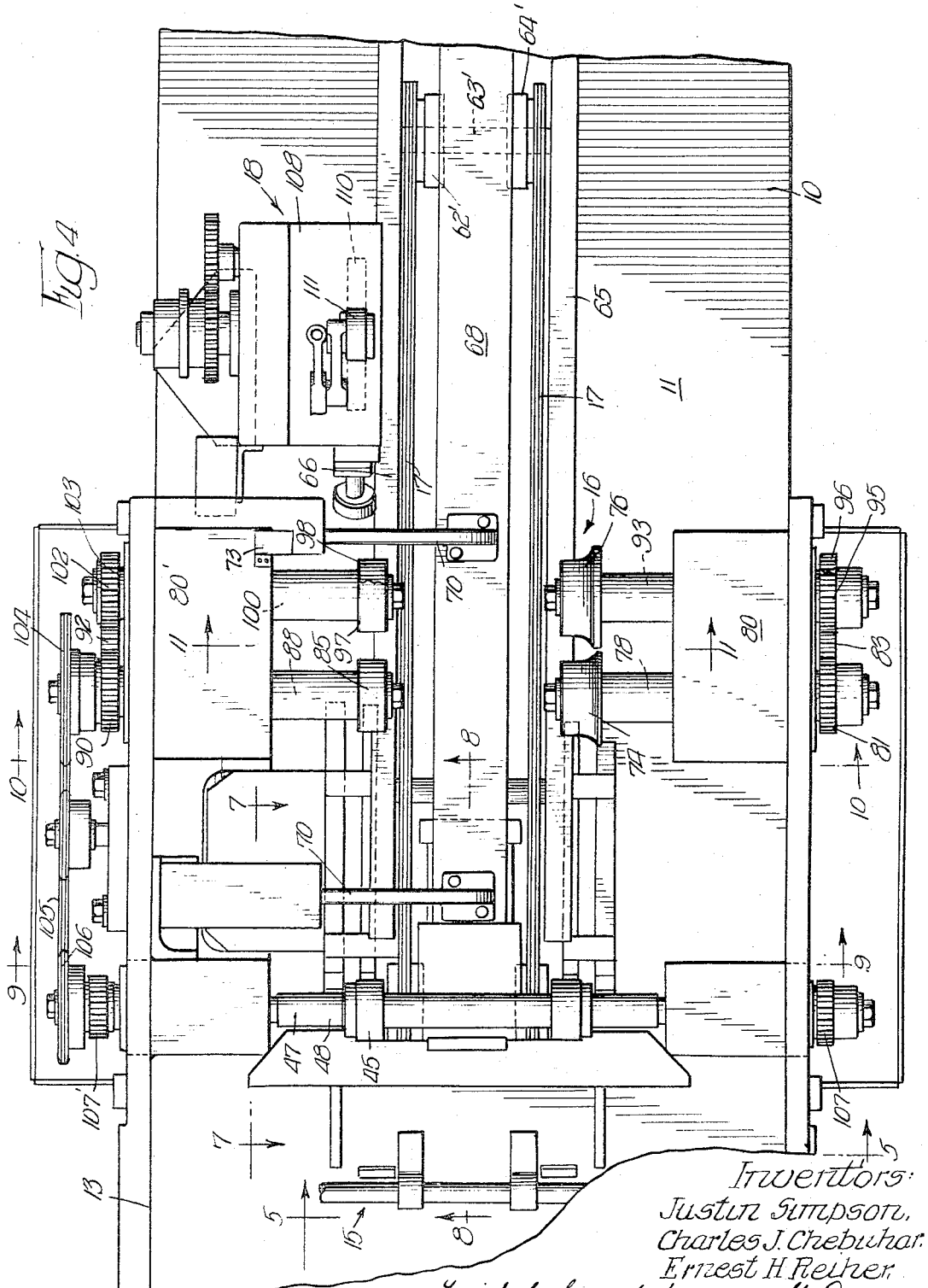

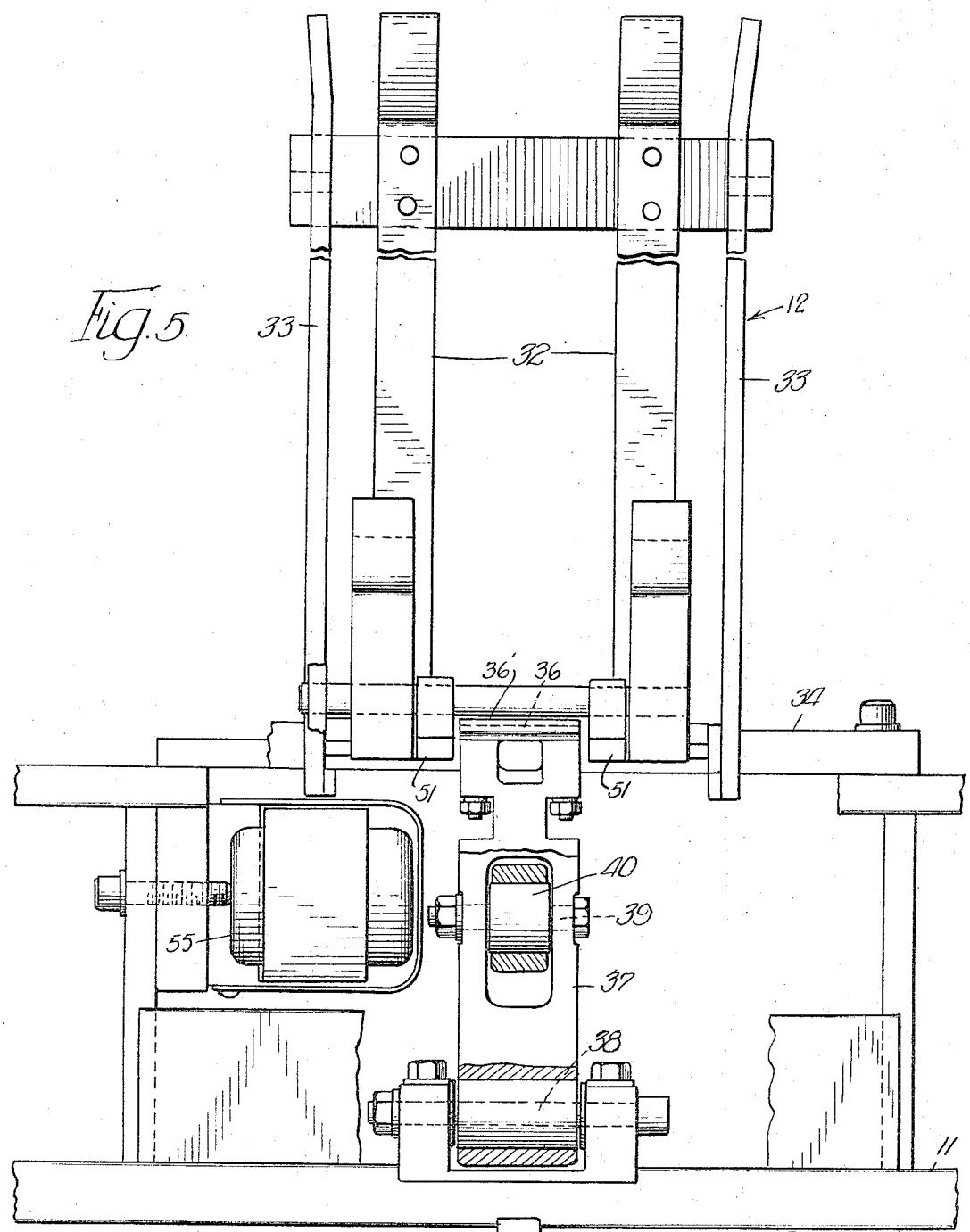

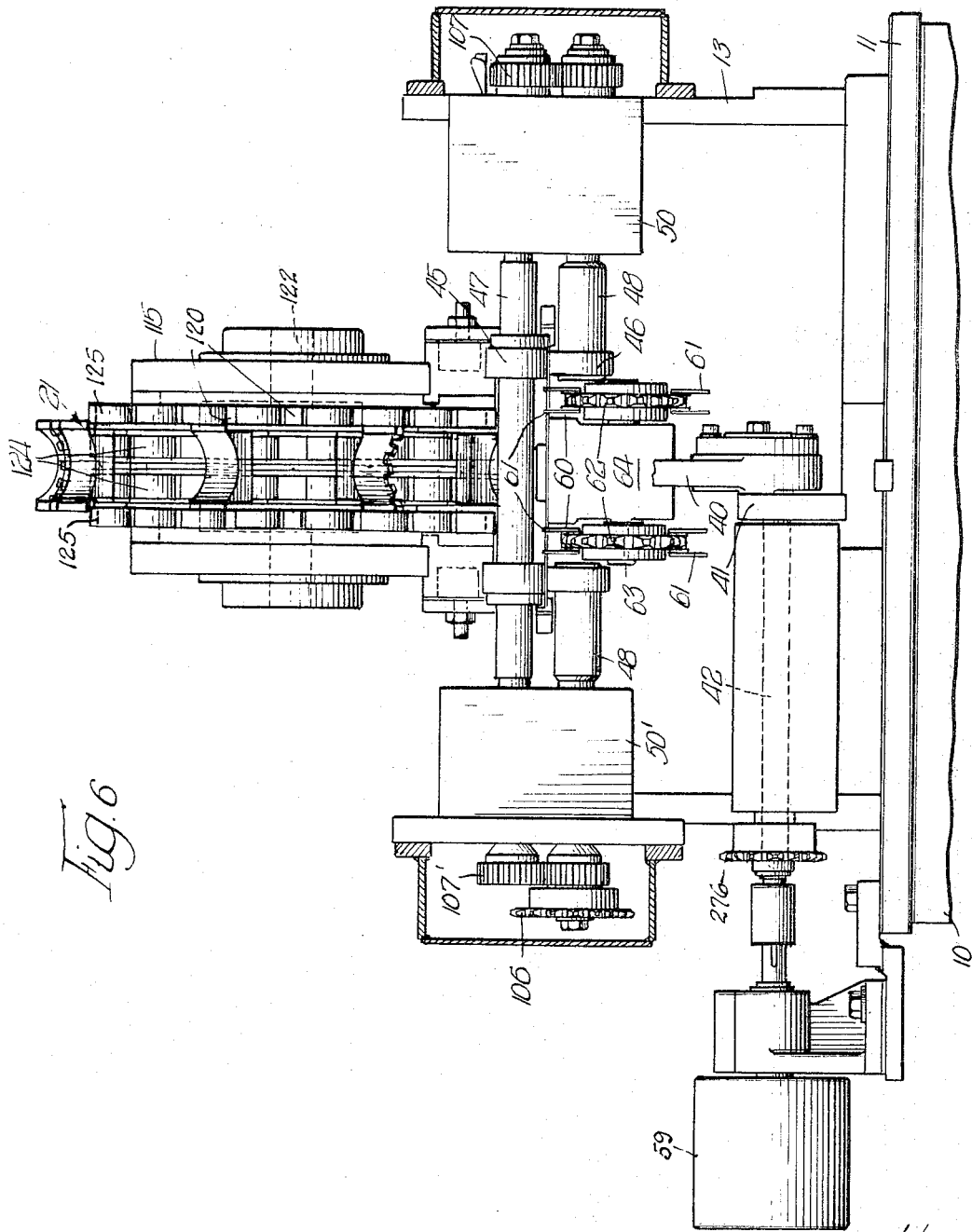

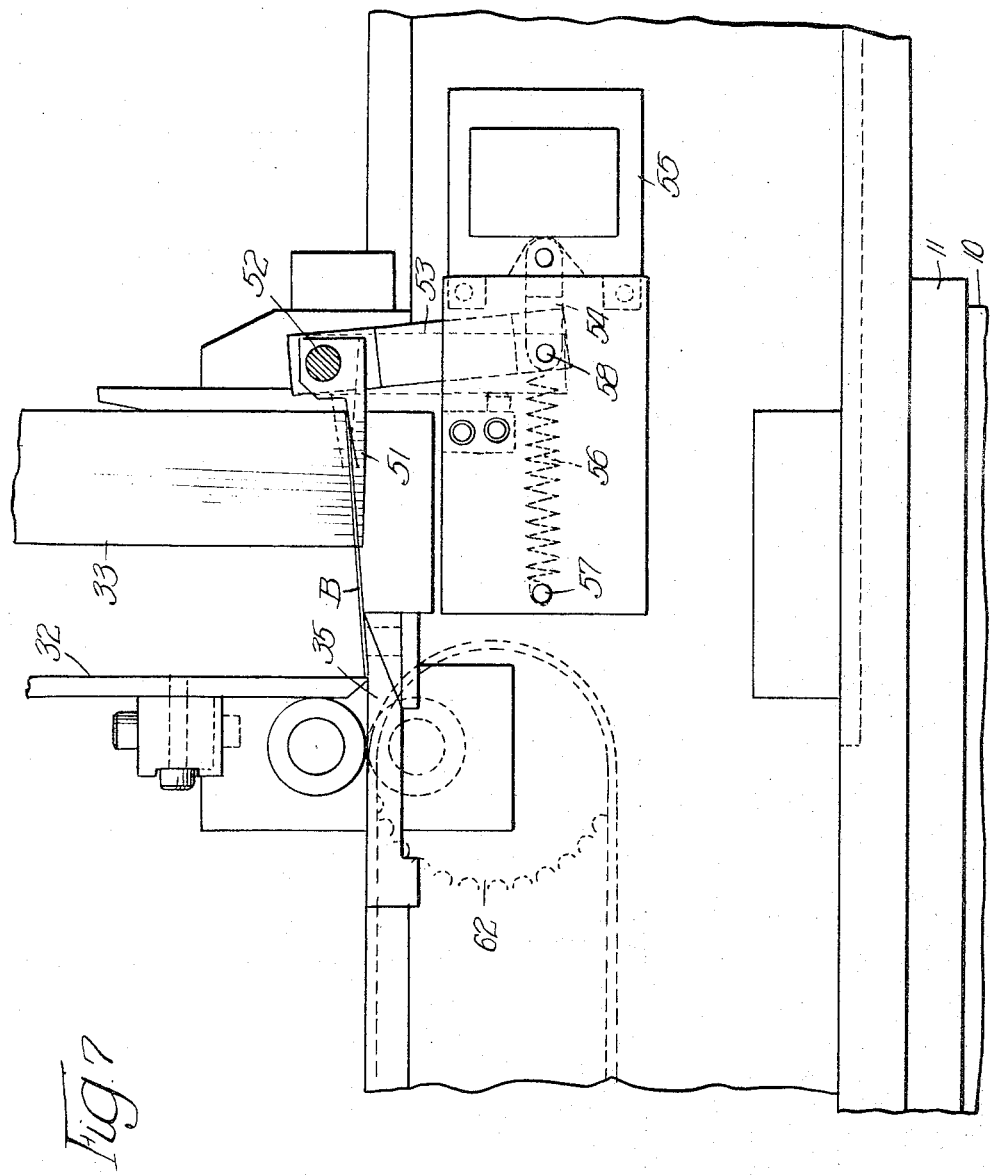

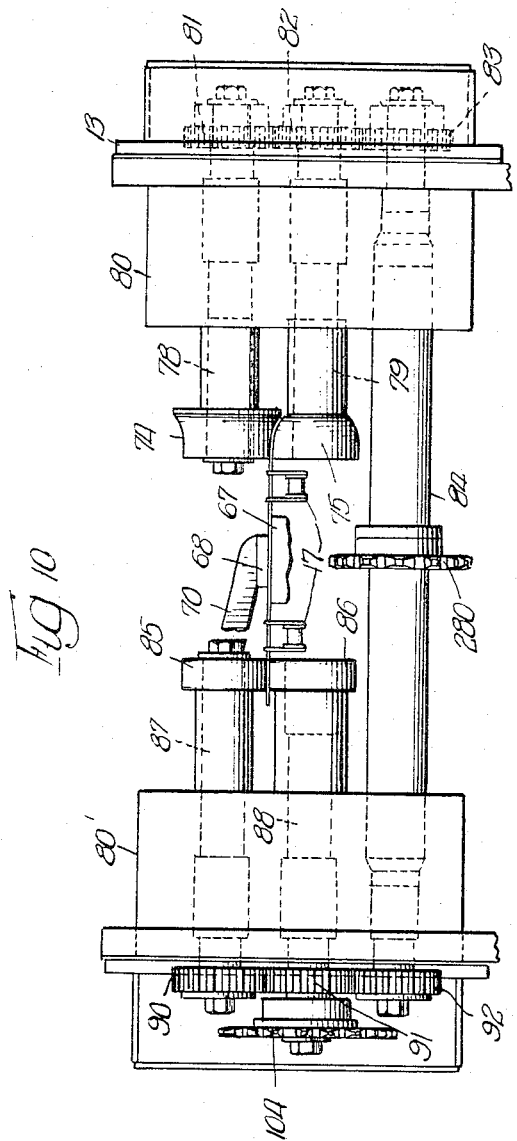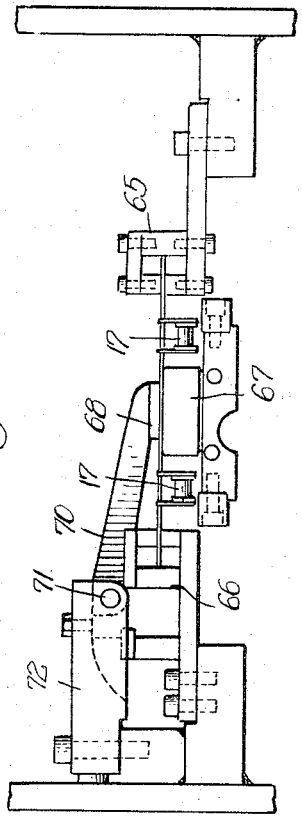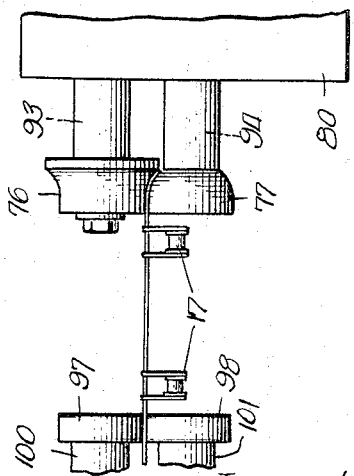

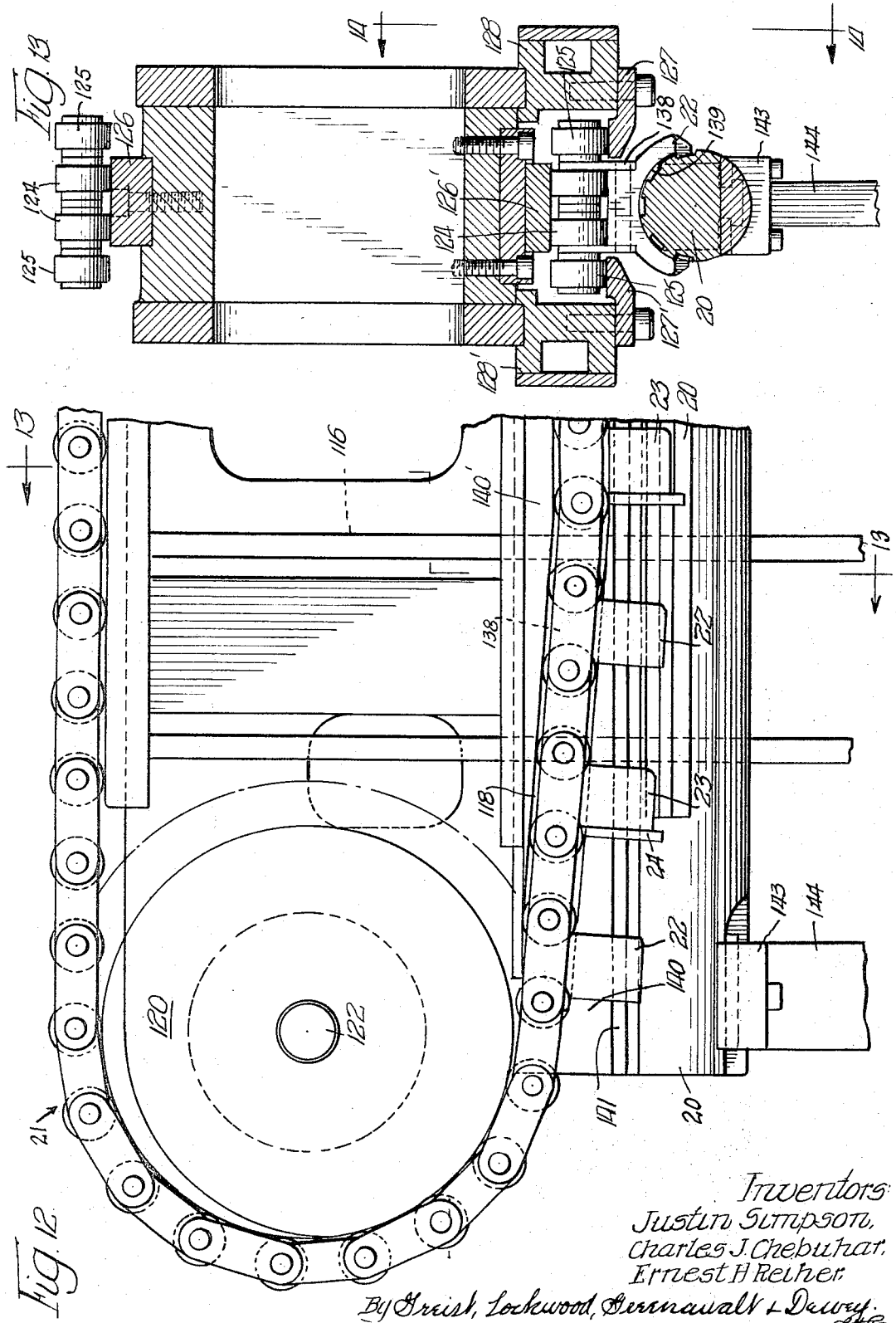

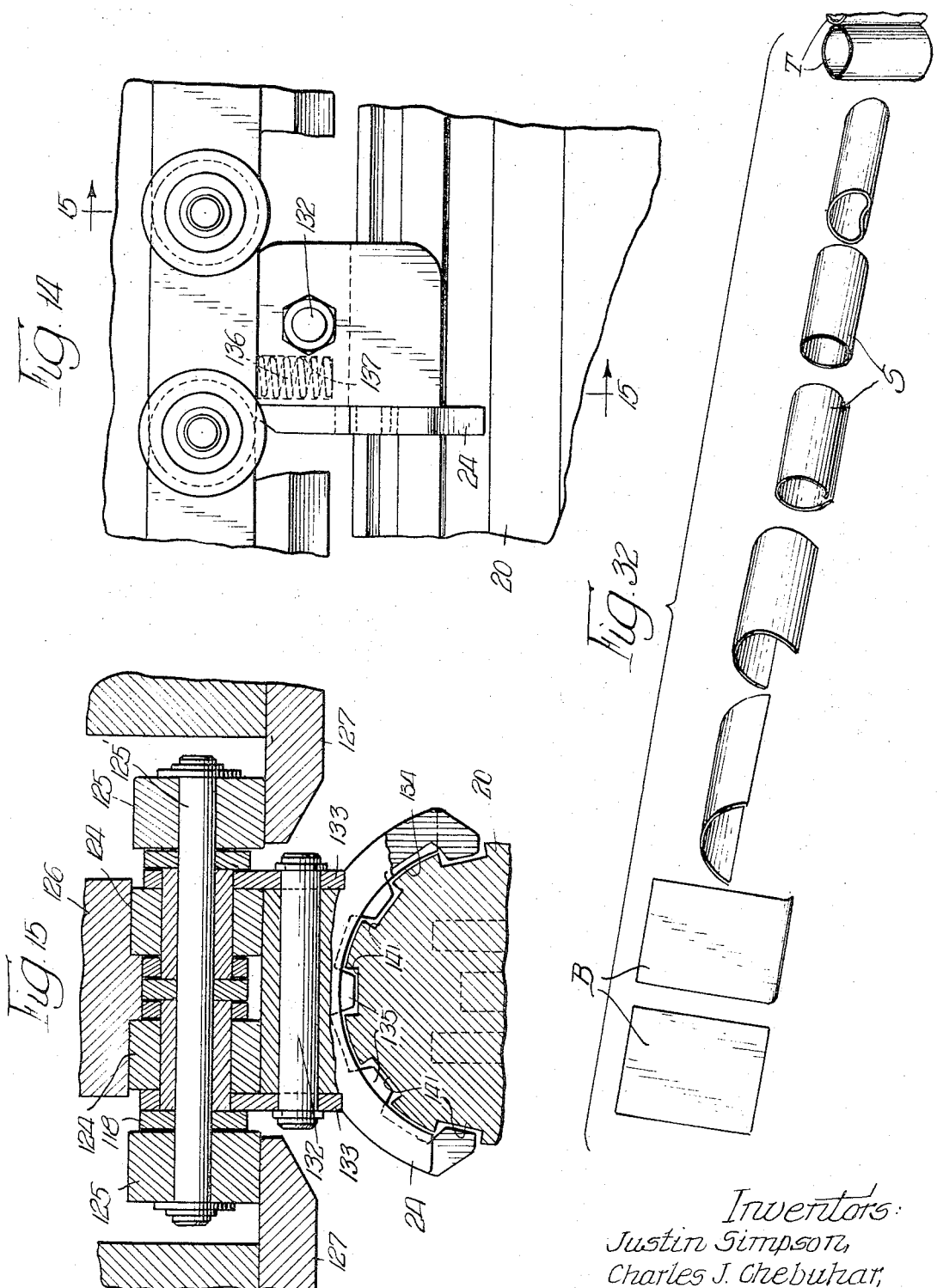

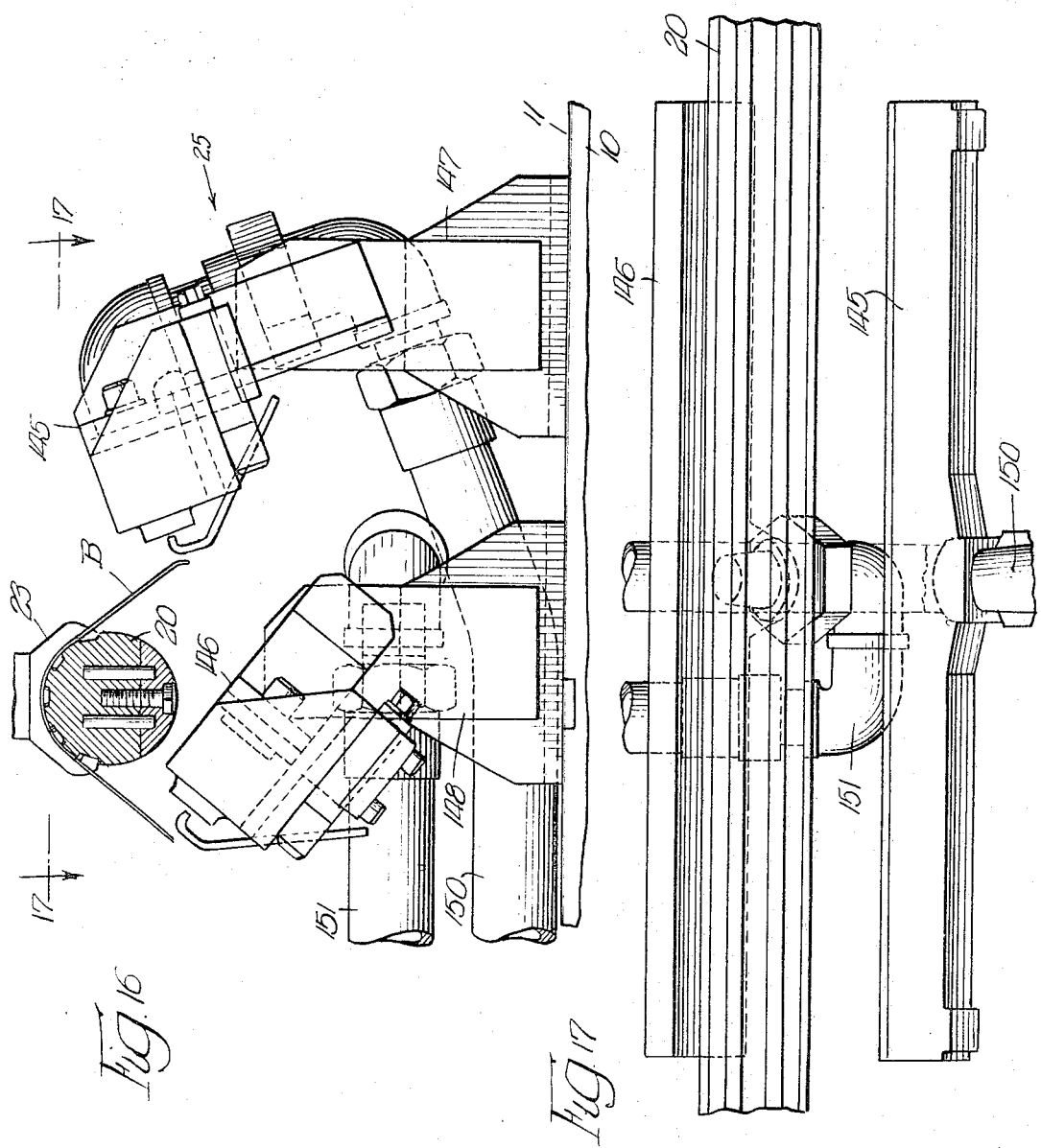

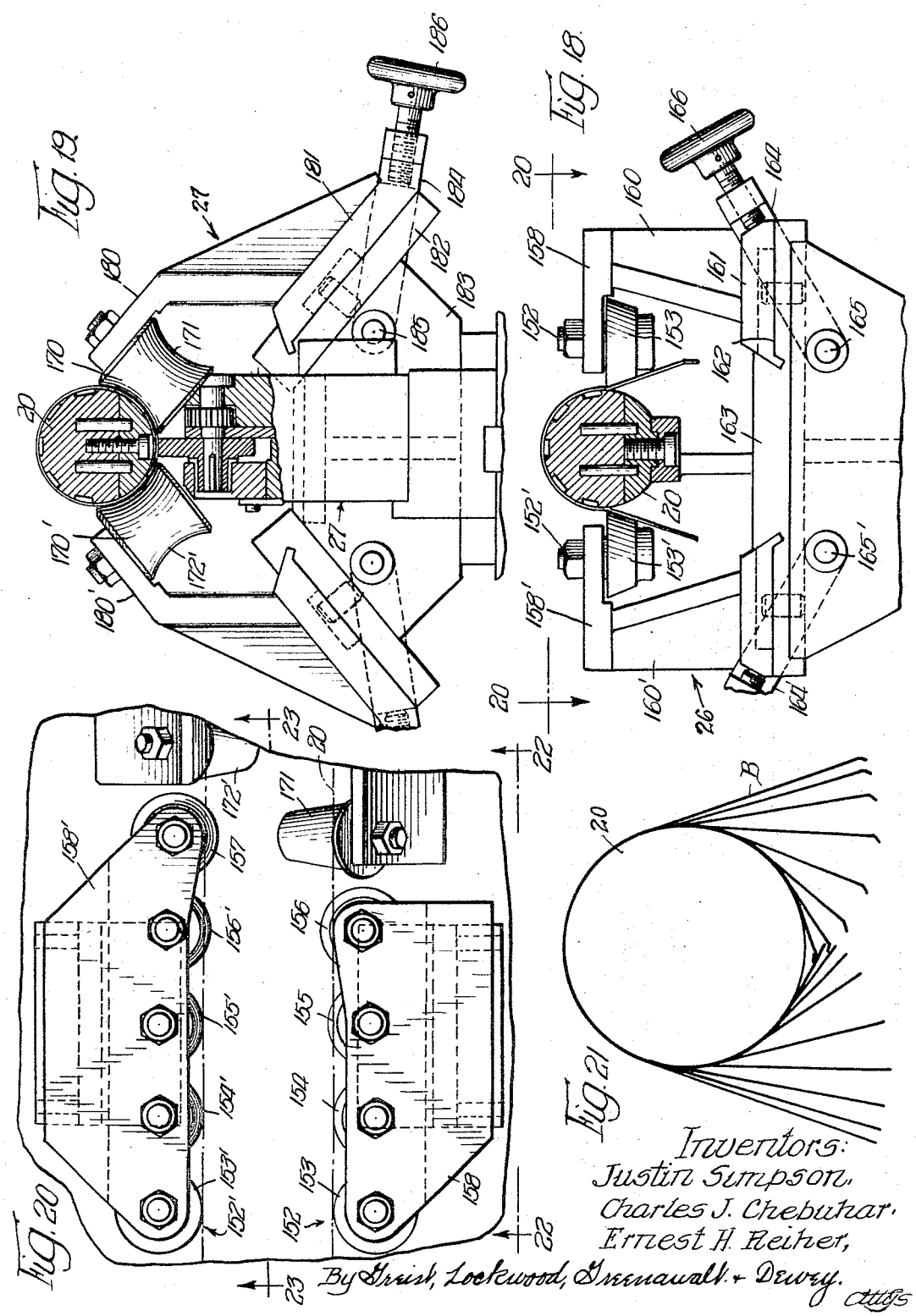

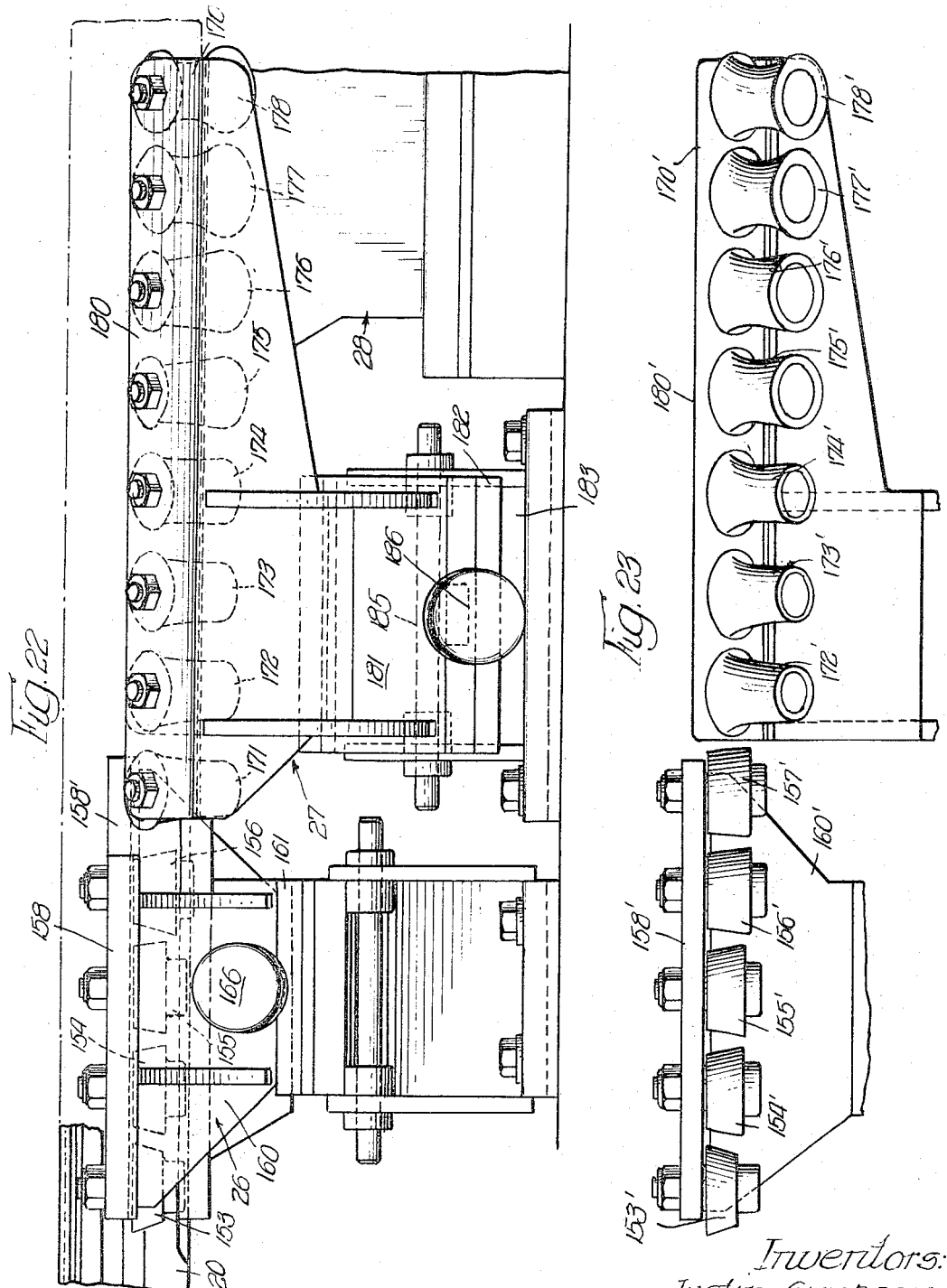

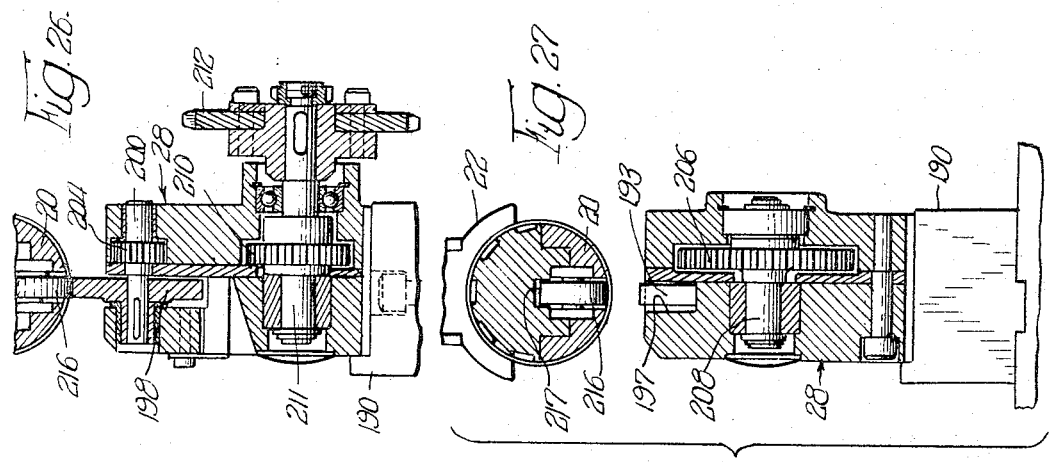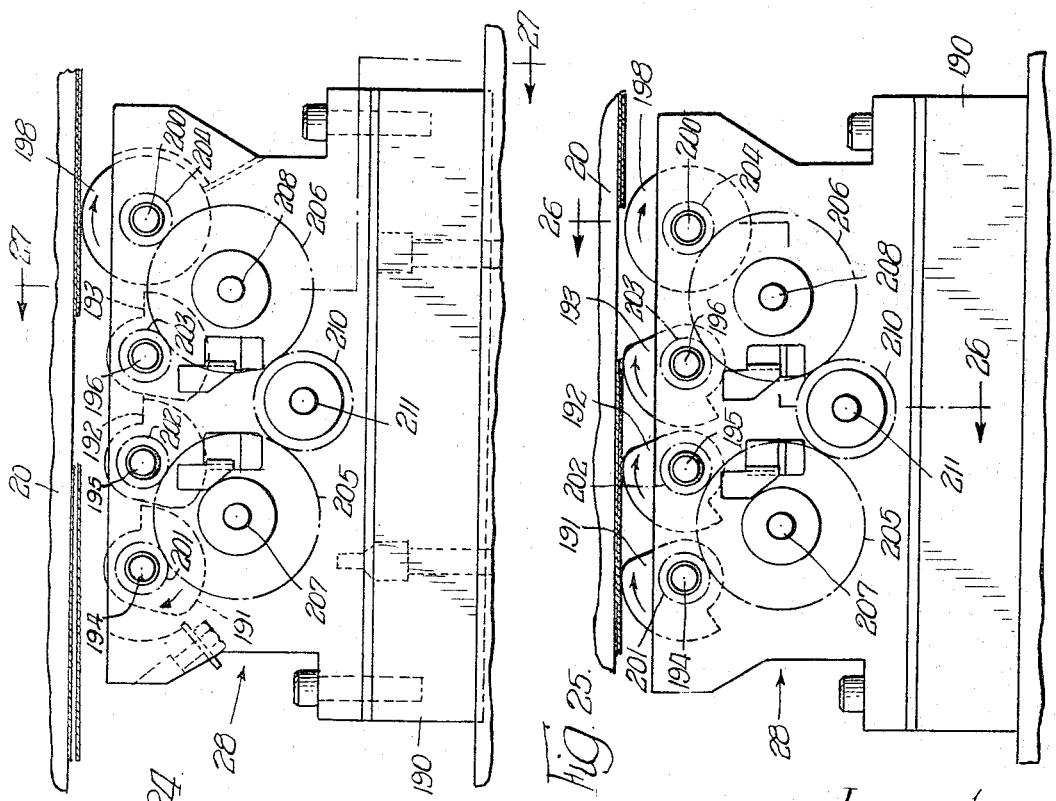

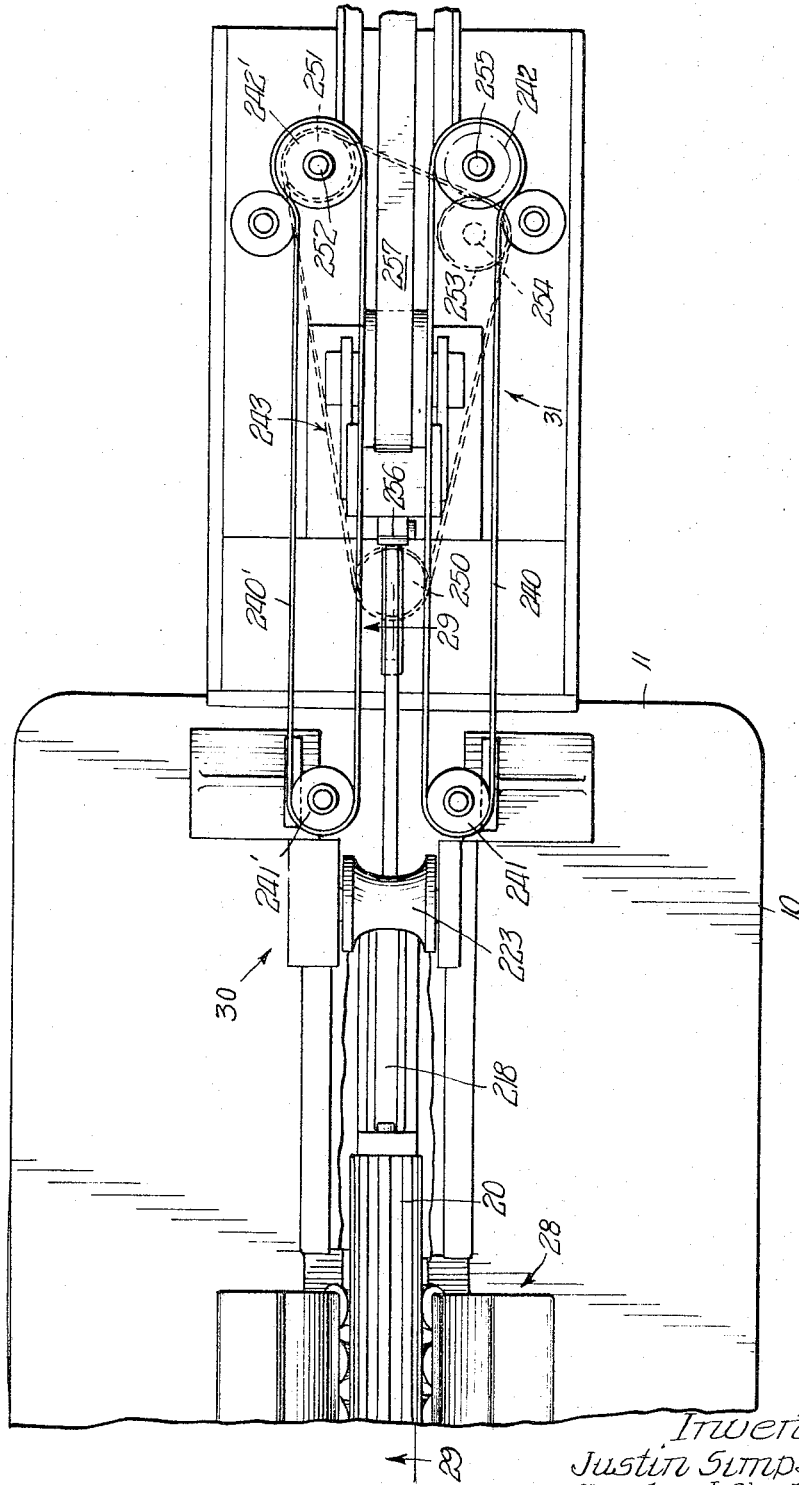

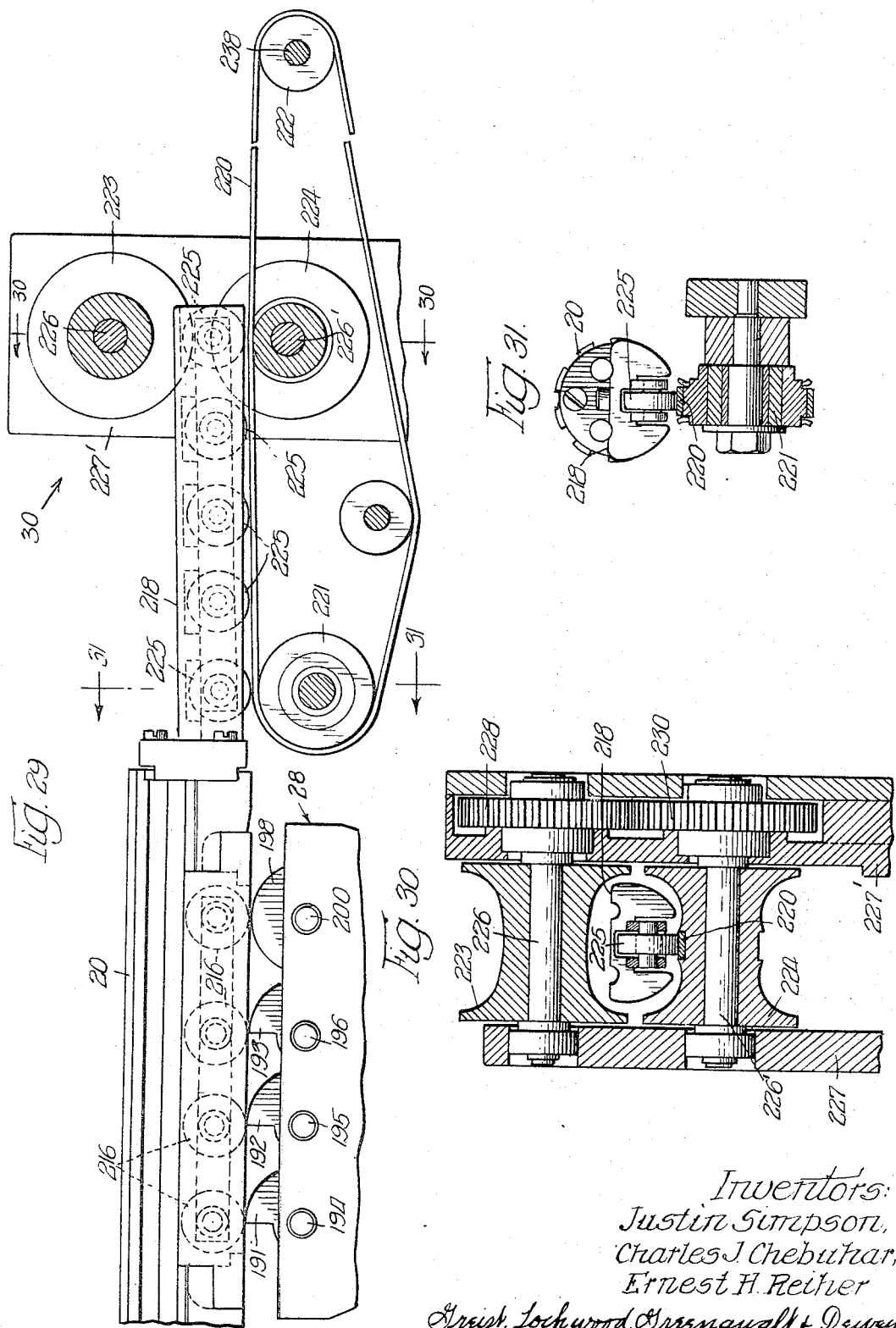

3,338,142
METHOD AND MACHINE FOR MAKING
TUBULAR CONTAINER BODIES
Justin Simpson, Elmhurst, and Charles J. Chebuhar, Chicago, Ill., and Ernest H. Reiher, St. Petersburg, Fla., assignors to Continental Can Company, Inc., New York, N.Y., a corporation of New York
Filed Feb. 8, 1965, Ser. No. 430,871
35 Claims. (Cl. 93—82)

This invention relates to container making and is more particularly concerned with improvements in methods and apparatus for fabricating from blanks of flexible sheet material tubular members which are adapted to be used as containers, container bodies or the like.

It is a general object of the invention to provide a method and apparatus for forming from blanks of relatively thin flexible sheet material open ended tubular members which are adapted for use as container members, or the like, wherein the forming operations are performed on successive blanks at a high rate of speed so as to achieve a high production rate and with a high degree of accuracy resulting in a product of uniform size and shape.

A more specific object of the invention is to provide an improved method and apparatus for forming successive blanks of flexible sheet material into tubes wherein the forming and sealing operations are performed rapidly and accurately so as to produce, at a high rate of speed, tubes of uniform diameter and shape which are suitable for subsequent application, in an efficient manner, of suitable metal end closures.

A still more specific object of the invention is to provide a method and apparatus for forming from rectangular sheets of flexible material tubular container bodies by shaping the sheets around a forming mandrel or horn while advancing the same at high speed, overlapping and sealing margins of the sheet to form a seam, stripping the tubular shape from the mandrel, and finally subjecting the successive tubes to a re-shaping operation to remove any distortion due to stresses resulting from the shaping and seam forming and to provide the tubes with a uniform diameter.

A further object of the invention is to provide a method and apparatus for forming tubular container bodies from generally rectangular blanks by advancing successive blanks past an initial device for preliminarily shaping a seam forming margin thereof to an elongate tubular mandrel where the blanks are picked up for advance along the mandrel by lugs on an endless traveling conveyor which lugs are shaped to impart an initial curvature to each successive blank and which also moves the blanks along the mandrel while the blanks are folded to conform to the shape of the mandrel by a series of forming rolls which progressively force each successive blank into tubular shape about the mandrel, the seam forming margins of the blank being moved while in substantially parallel relation into tight overlapped engagement with each other throughout the length of the lap area, and pressure being applied to set the same after which the endless tube thus formed is advanced to a reforming station where it is removed from the mandrel and passed between a pair of reforming rolls which reshape the tube to remove any distortion resulting from folding, heating and seam forming operations.

It is another object of the invention to provide in a container body forming machine an elongate cylindrical mandrel around which a rectangular sheet is formed into a tube and a co-operating overhead conveyor having blank engaging blocks thereon which have the outboard faces thereof shaped to conform to the shape of the mandrel with certain of the blocks having associated outboard lug portions for engaging the trailing ends of the blanks so as to advance the blanks along the mandrel surface, and the pusher forming lug portions having a degree of resiliency sufficient to absorb any backward pressure on the blank so as to prevent damage to the trailing edge thereof.

A further object of the invention is to provide in a container fabricating machine wherein a tubular container body is formed by folding a generally rectangular blank about an elongate cylindrical forming horn while the blank is advanced along the horn at a relatively high speed, a mechanism for lapping marginal portions of the blank so as to form a lapped seam which brings the seam forming marginal portions into engagement by movement toward each other while they are in substantially parallel relation so as to obtain maximum plug center accuracy and avoid skewing of the lap seam forming margins during the forming and setting operations.

Another object of the invention is to provide in a container body forming operation wherein successive body forming blanks are shaped into tubes around a cylindrical forming mandrel and lap seamed, a mechanism for reforming or reshaping the tubes when they are removed from the mandrel so as to overcome any distortion resulting from the seaming operation, which mechanism includes a pair of shaping wheels between which the tubes are passed and which distort each tube throughout its length to a predetermined degree depending upon the characteristics of the blank material so that when it is released the tube returns to the desired uniform diameter for discharge from the machine.

Still another object of the invention is to provide a method and apparatus for forming lapped seam container bodies from flat blanks which are supplied with an adhesive material on the seam forming area wherein successive blanks are fed to an overhead endless conveyor chain on which there are spaced blocks having concave outboard surfaces which initially start the forming operation and which have associated lugs for pushing the blanks along a forming horn progressively past a number of forming rolls which contact each successive blank and form it into a cylinder, the adhesive bearing lap areas being kept apart due to the disposition of the forming rolls relative to the horn until the seam forming area is reached where the outermost lap is raised uniformly over its full length and pressure is applied to set the seam with the body being restrained on the horn so that the completed cylinder is held to accurate internal dimensions.

These and other objects and advantages of the invention will be apparent from a consideration of the method and apparatus which are shown by way of illustration in the accompanying drawings wherein:

FIGURE 1 is a plan view of a container body making machine which incorporates therein the principal features of the invention, portions of the machine being omitted and other portions being broken away;

FIGURES 2A and 2B constitute a side elevation of the machine to a larger scale and with portions thereof broken away or omitted;

FIGURES 3A and 3B constitute a vertical section taken on the line 3—3 of FIGURE 1 to a larger scale and with parts broken away or omitted;

FIGURE 4 is a partial plan view at the entrance end of the machine, the view being taken on the line 4—4 of FIGURE 3A, to a still larger scale and with parts broken away or omitted;

FIGURE 5 is a partial transverse cross section taken on the line 5—5 of FIGURE 4;

FIGURE 6 is a cross section taken on the line 6—6 of FIGURE 2A, to an enlarged scale;

FIGURE 7 is a fragmentary cross section taken on the line 7—7 of FIGURE 4, to a larger scale;

FIGURE 8 is a vertical section taken on the line 8—8 of FIGURE 4, to a larger scale;

FIGURE 9 is a fragmentary cross section taken on the line 9—9 of FIGURE 4;

FIGURE 10 is a fragmentary cross section taken on the line 10—10 of FIGURE 4;

FIGURE 11 is a fragmentary cross section taken on the line 11—11 of FIGURE 4;

FIGURE 12 is a sectional view on the line 12—12 of FIGURE 1, to an enlarged scale;

FIGURE 13 is a fragmentary cross section taken on the line 13—13 of FIGURE 12;

FIGURE 14 is a view taken on the line 14—14 of FIGURE 13;

FIGURE 15 is a vertical section taken on the line 15—15 of FIGURE 14;

FIGURE 16 is a view taken on the line 16—16 of FIGURE 2A;

FIGURE 17 is a view taken on the line 17—17 of FIGURE 16;

FIGURE 18 is a cross section taken on line 18—18 of FIGURE 2B, to a larger scale;

FIGURE 19 is a cross section taken on the line 19—19 of FIGURE 2B, to a larger scale;

FIGURE 20 is a fragmentary view taken on the line 20—20 of FIGURE 18;

FIGURE 21 is a schematic view illustrating the progressive folding of the blank about the horn;

FIGURE 22 is a partial longitudinal elevation taken on the line 22—22 of FIGURE 20;

FIGURE 23 is a partial longitudinal section taken on the line 23—23 of FIGURE 20;

FIGURE 24 is a fargmentary side elevational view showing the seal forming mechanism;

FIGURE 25 is a view similar to FIGURE 24, with the elements in a different position;

FIGURE 26 is a cross section taken on the line 26—26 of FIGURE 25;

FIGURE 27 is a cross section taken on the line 27—27 of FIGURE 24;

FIGURE 28 is a partial plan view of the discharge end of the machine, to an enlarged scale;

FIGURE 29 is a vertical section taken on the line 29—29 of FIGURE 28, to a larger scale;

FIGURE 30 is a cross section taken on the line 30—30 of FIGURE 29;

FIGURE 31 is a cross section taken on the line 31—31 of FIGURE 29; and

FIGURE 32 is a schematic view illustrating the various operations carried out on the blank as it progresses through the machine.

Referring first to FIGURE 32, the method and apparatus are illustrated in connection with the forming of open ended tubular members T which are suitable for use as can bodies, from blanks B of paperboard, the successive blanks being shaped into tubular form and provided with a longitudinal seam S derived by overlapping marginal portions of the blank and heat sealing or otherwise securing, as by an adhesive or the like, the overlapped margins into seam formation.

The blanks B, as illustrated, are formed preferably from sheets of relatively thin, flexible paperboard which is coated on both sides with a film forming material which is heat sealable, for example, polyethylene. The edges of the blanks are also coated to prevent wicking and the tubular section, when completed, is designed to be subsequently formed into a can by applying suitable end closures. The invention is not limited to fabrication of a paperboard can body. It is equally applicable to the formation of tubular body members for other purposes which may be made from relatively thin flexible sheets of tinplate, aluminum, composite metal foil, laminated plastics, plastics or paper, or other similar material. Also, it will be understood that the lapped seam S may be made with the addition of an adhesive or by activating previously applied materials on the body blank through the application of heat and/or pressure.

Briefly, the machine comprises, as shown in FIGURES 1 to 4, an upright supporting frame or base 10 on the top 11 of which various mechanisms for operating on the blanks B to form the tubes T are mounted, with the base 10 forming a convenient housing for portions of the drive mechanism. The blanks B are supplied in a stack disposed in a vertically extending magazine 12 at the entrance end of the machine. The blank supply magazine 12 extends above a subframe 13 which houses a blank feeding mechanism 15, the latter forwarding the blanks in a horizontal path to a shaping mechanism indicated at 16 which preliminarily shapes a marginal side portion of each blank. The blanks are advanced by a conveyor 17 through the preliminary shaping mechanism 16 and past a glue applying device indicated at 18 to a longitudinally disposed forming horn or mandrel 20. The elongate horn 20 extends horizontally in the longitudinal direction of the machine and is longitudinally aligned with the conveyor 17. An overhead endless conveyor 21 is mounted above the mandrel 20 with its lower run extending longitudinally of the machine immediately above the horn 20 and carries thereon longitudinally spaced pairs of forming blocks 22 and 23 which preliminarily form the blanks B into a shape conforming to the top surface of the horn 20. The trailing forming block 23 of each pair thereof has associated pusher means 24 for engaging the trailing edge of a blank and pushes it along the mandrel 20. The blanks are advanced past a heating mechanism at 25 where the adhesive on the side margins of the blank is activated so as to form a seal when the seam forming margins are subsequently overlapped. As the blanks are advanced along the horn 20 by the conveyor 21 the side marginal portions of each blank are progressively folded in beneath the horn 20 by two groups of folding or forming rolls indicated at 26 and 27. The tube thus formed around the horn 20 has the overlapped margins which are adapted to form the longitudinal seam still out of engagement with each other as the blank is advanced to a pressure applying mechanism at 28 which completes the seam by moving the lap forming side margins against each other, with the lowermost lap being lifted while it is substantially parallel with the uppermost lap, and pressed against the bottom of the forming horn rollers 216. The completely formed tube is stripped from the horn 20 after pressure is applied to the lapped portions and then passed through a reforming or reshaping device, indicated at 30, after which it is delivered out of the machine by a discharge conveyor 31, the conveyor 31 having associated with it a device for upending the finished tubes so as to deliver them in side-by-side relation.

In order to fully understand the structure and operation of the machine, the details of the various mechanisms are illustrated in the drawings and will be hereinafter described. The blank supply magazine 12 at the entrance end of the machine (FIGURES 2A and 4 to 8) comprises a pair of laterally spaced forward plates 32 and a pair of laterally spaced side plates 33 all of which extend upwardly from a cross support bracket member 34 mounted on the frame 13 on the top 11 of the supporting base 10. The stack of blanks B is supported at the leading edge thereof on a slotted cross plate 35 which is spaced below the lowermost ends of the vertical plates 32 a sufficient distance to allow a single blank to pass through the gate-like opening between the plate 35 and the lower extremities of the magazine plates 32. At the trailing end the stack is supported on the top surface 36 of an upwardly extending extractor lever 37, the latter being pivoted at its bottom end on the fixed pin 38 and having a pivotal connection at 39, intermediate its ends, with the free end of a connecting rod 40 which has its other end connected to a crank 41 mounted on the cross shaft 42 which is journaled in the frame 13. The extractor lever 37 is in two parts and has curved top surfaces 36 and 36' with the top surface 36 on the leading part, or the right hand part as viewed in FIGURE 8, being below the top surface 36' on the trailing part so as to create a blank engaging ledge 44 which feeds a single blank from the bottom of the stack when the lever 37 is reciprocated by operation of the crank 41 and connecting rod 40, the blanks being fed through the gate in front of the stack to a pair of co-operating sectional feed rolls 45 and 46 (FIGURE 6) which are mounted on parallel, transversely extending driven shafts 47 and 48, the latter being journaled in suitable bearing units 50 and 50' mounted in the side frame members of the subframe 13.

The blank feed 15 includes a control mechanism to start or stop feeding of the blanks as dictated by controls in an electrical control circuit without interrupting the operation of the machine. An L-shaped fork forming member 51 is mounted on an oscillatable cross shaft 52 which has a lever arm 53 depending from one end thereof and connected at its lower end by the link 54 with a solenoid 55. A tension spring 56 is anchored to a fixed portion of the frame at 57 and connected at 58 to the lower end of the lever 53. The solenoid 55 is operated by a timing switch 59 having a connection with a start and stop button under the control of the machine operator. Operation of the solenoid 55 swings the lever 53 to raise and lower the stack of blanks B and the timing switch operates so that the stack is raised or lowered at the proper time in the feeding cycle. When the operator pushes the stop button the timer 59 operates the lever 53 to raise the stack at a predetermined time relative to the swinging movement of the extractor lever 37 so that there is no jamming. The extractor lever 37 then swings below the raised blanks without effect. When the start button is pushed the timer operates to lower the stack at the proper time for the lever 37 to feed the bottom most blank.

As each blank B is advanced from the magazine 12 by the feed rolls 45 and 46, it is picked up by the conveyor 17 (FIGURES 2A, 6 and 8) which comprises a a pair of laterally spaced endless chains 60 having longitudinally spaced lugs or pusher forming fingers 61 which engage the trailing edges of successive blanks as they pass between the feed rolls 45 and 46. The conveyor chains 60 are supported on sprockets 62 at the trailing end thereof and on sprockets 62' at the leading end. The chain supporting sprockets 62 are mounted on a cross shaft 63 journaled in a bearing support 64 (FIGURE 6) while the sprockets 62' are mounted on a cross shaft 63' (FIGURE 4) journaled in a bearing support 64', with proper tension in the chains being obtained by suitable tensioning sprockets arranged in a conventional manner. The conveyor 17 extends to a point beneath the trailing end of the overhead conveyor 21 where movement of the blank is taken over by the overhead conveyor 21 and the blank is thereafter advanced by the conveyor 21 onto the forming horn 20. As the blank is advanced by the conveyor 17 it is held against lateral movement by side guides 65 and 66 (FIGURES 8 and 9) while it is held down against a center bottom guide plate 67 by a longitudinally extending guide bar 68 forming part of a U-shaped holddown frame 70. The holddown frame 70 is pivotally mounted at 71 on a fixed bracket 72 at the one side of the machine. A switch 73 (FIGURE 8) is actuated if a body blank is jammed or superposed blanks are fed so as to raise the hinged guide frame 70 and the entire machine is stopped including the blank feed.

Two pairs of preform rolls (FIGURES 10 and 11) 74, 75 and 76, 77 are mounted along the conveyor 17 which bend or shape the one side marginal portion of each blank which subsequently forms the inside lap of the longitudinal seam so that it has approximately the contour of the forming horn 20 and will stay clear of the outside lap when it is folded in beneath the same as the blank advances along the horn. The marginal portion at the opposite side of the blank constitutes the outside lap when the folding of the blank is completed. The two sets of preform rolls 74, 75 and 76, 77 have complementary curved surfaces, shown in FIGURES 10 and 11, so as to turn the marginal portion of the blank down as it is moved between the rolls by conveyor 17. The first set of preform rolls 74 and 75 are mounted on horizontally disposed parallel stub shafts 78 and 79 which are journaled in a bearing unit 80 secured on the side frame plate of the subframe 13 and the shafts 78 and 79 carry at their outer ends co-operating interengaging gears 81 and 82 (FIGURES 2A, 4 and 10) which are driven through engagement with the gear 83 on a drive shaft 84 extending transversely of the machine and journaled in the bearing units 80 and 80' secured on the side frame plates. A pair of co-operating blank gripper rolls 85 and 86 are mounted opposite the preform rolls 74, 75 on stub shafts 87 and 88 which are axially aligned with the shafts 78 and 79. The shafts 87 and 88 are journaled in bearing unit 80' and carry connecting gears 90 and 91 at their outer ends which are driven by the gear 92 on the end of the cross drive shaft 84. The second set or pair of preform rolls 76, 77 (FIGURE 11) are mounted on the inner ends of stub shafts 93 and 94 which are journaled in suitable bearings in the bearing unit 80 and which carry at their outer ends interengaging gears 95 and 96 (FIGURES 2A and 4), with the gear 96 also in engagement with the gear 83 on the cross drive shaft 84. At the other side of the machine blank gripper rolls 97 and 98 are mounted on stub shafts 100 and 101 which are in axial alignment with the shafts 93 and 94 and which are journaled in the bearing unit 80' with interengaging gears 102 and 103 mounted on the outer ends thereof and the lowermost gear 103 engaging with the gear 92 on the cross drive shaft 84. The one stub shaft 88 is extended at the outer end and carries a sprocket 104 (FIGURES 4 and 10) which is connected by a drive chain 105 with a sprocket 106 (FIGURES 4 and 6) on the extended end of the lowermost shaft 48 carrying the blank feed roll 46. The roll shafts 47 and 48 are connected in driving relation at their opposite ends by interengaging gears 107 and 107'.

The successive blanks are advanced past the preform rolls 76 and 77 by the lugs on the conveyor 17 to the adhesive applying mechanism 18 which is located at the far side of the machine, as indicated in FIGURE 2A, when the blanks which are employed require the application of an adhesive for the longitudinal seal. The adhesive is supplied by a suitable supply mechanism to a tank 108 in which there is mounted an applicator roll 110 of the proper width for applying the required adhesive. A back up roll 111 is upwardly, yieldably mounted in a suitable manner above the applicator roll 110 and urges the blanks into engagement with the applicator roll to insure that they are properly coated with adhesive. The adhesive applicator mechanism 18 is not employed on the machine when blanks are supplied with a pre-applied type of activatable adhesive, or blanks having a plastic coating, or blanks in the form of a plastic laminate where the plastic serves as an adhesive to form a seal upon being activated by heat and the application of pressure to the seam forming surfaces.

Each successive blank is picked up at the forward end of the conveyor 17 by the overhead conveyor 21 and thereafter advanced onto the top of the tube forming horn 20. The overhead conveyor 21 (FIGURES 1, 2A, 2B and 6) is mounted on a frame 115 which is upstanding from the top 11 of the base 10 and supported on opposite ends on the upstanding post forming inverted J-shaped bracket members 116 and 117. The conveyor 21 comprises a double chain 118 mounted on end sprockets 120 and 121 which are supported on horizontal cross shafts 122 and 123 mounted in suitable bearings in the ends of the elongate frame 115. The chain 118 has pairs of inboard and outboard rollers 124 and 125 (FIGURES 12 to 15) mounted on the pivot pin 125' connecting the link plates. The inboard rollers 124 ride on center guide bars 126 and 126' (FIGURES 3A and 13) extending longitudinally on the top and bottom of the frame 115. The outboard rollers 125 ride on side guide bars 127 and 127' which are mounted on the bottom of hollow bottom side rails 128 and 128' (FIGURES 2 and 13) which have provision for circulating therein a cooling fluid to cool the frame 115. The blank supporting and forming blocks 22 and 23 are arranged in pairs and in alternately spaced relation along the length of the chain 118. The one block 23 (FIGURES 14 and 15), which is the trailing block of each pair thereof along the bottom run of the chain 118, is pivotally mounted on a cross pin 132 extending between bracket plates 133 which are attached to the chain plates so that the block has a small amount of pivotal movement. The block 23 has a concave surface 134 facing outwardly of the path of the chain with the curvature corresponding to the curvature of the top of the forming horn 20. Each block 23 has mounted on the trailing face thereof a pusher plate 24 having an outer edge of the same general curvature as the face 134 of the block and a plurality of spaced finger formations 135 which are adapted to engage the trailing end of the blank and advance it along the horn 20. The block 23 is urged towards a slightly canted position relative to its supporting bracket 133 by a compression spring 136 seated in a socket 137 in the block 23 and bearing against a cross plate portion of the mounting bracket 133. This allows for some yielding of the pusher 24 when the blank meets with resistance in its advancing movement along the horn 20 and reduces the likelihood of damage to the trailing end of the blank. The block 22 may be identical with the block 23 with omission of the pusher plate and it does not necessarily need to be pivoted or have the spring 136. It is carried on the chain 118 by a mounting bracket 138 and has a curved outboard face 139 of the same contour, as face 134. As the chain 118 rounds the sprocket 120 the path of the blank supporting blocks 23 and 24 is somewhat above the top surface of the horn 20. Inclined side guide extensions 140 and 140' (FIGURE 12) are mounted on the frame 115 which form an inclined track for the outboard rollers 125 and guide the chain 118 downwardly to bring the concave surfaces 139 and 134 of the forming blocks 22 and 23 within blank thickness from the top surface of the horn 20 and the outboard rollers 125 onto the bottom guides 127, 127'.

As a blank is picked up by the pusher plate 24 on the block 23 and the leading edge of the blank advances into engagement with the top surface of the horn 20 the blank bends and as it advances down the incline formed by the guides 140 and 140' the concave surfaces 139 and 134 of the blocks 22 and 23 initially curve or form the blank toward the tubular shape of the horn 20 and finally press the blank against the top surface of the horn. The horn 20 is provided with circumferentially spaced, longitudinally extending grooves 141 (FIGURES 13 and 15) on the upper surface for accommodating the fingers 135 of the pusher 24 on the blocks 23. It is supported at the entrance end thereof on a cross support 143 (FIGURES 3A and 12) on an upstanding support post 144 which is arranged to allow for expansion of the horn due to temperature changes. The horn 20 is provided with longitudinally extending, water accommodating chambers having appropriate connections with a cold water supply line so as to circulate water or other cooling liquid throughout the length of the horn and control the temperature thereof.

As a blank is moved onto the horn 20 by a pusher plate means 24 on the conveyor 21, it is first moved past the heating mechanism 25 comprising a pair of heating devices 145 and 146 (FIGURES 16 and 17) which are mounted on upstanding brackets 147 and 148 on the top 11 of the supporting base 10. The heaters 145 and 146 are preferably gas burner type having the usual ignition electrodes and flame detectors and they are arranged so that heat is applied along the side margins of the blank on the surfaces which are subsequently overlapped to form the longitudinal seam. The burners 145 and 146 are supplied from a suitable gas line through conduits indicated at 150 and 151.

As a blank is advanced beyond the heating devices 145 and 146 the leading edge of the blank contacts the first of the forming rolls in the two sets thereof which are indicated at 26 and 27 in FIGURE 2B. The first set of forming rolls 26 comprises two roll assemblies 152 and 152' (FIGURES 18 to 23) which are supported on opposite sides of the horn 20. The forming roll assemblies 152 and 152' are of similar construction, being rights and lefts, the left assembly, in the direction of advance of the blank, being of somewhat greater length and having an additional roll. The right roll assembly 152 comprises four rolls 153, 154, 155 and 156 which have peripheral surfaces of truncated cone shape providing beveled blank contacting edges. The rolls are mounted on a supporting top plate 158, as shown in FIGURES 18 and 20, so that the tapered edge surfaces of the rolls progressively fold the side edges of the blank down around the one side and towards the bottom of the horn 20 as shown diagrammatically in FIGURE 21. The opposite roll assembly 152' which is constructed in a similar manner, like elements being indicated by the same numerals primed, has an additional forming roll 157 (FIGURES 20 and 23). The supporting plate 158 constitutes a longitudinally disposed top member of a support bracket 160 which has a base plate 161 slidably mounted on a track formation 162 in the top of a support bracket 163 upstanding from the top 11 of the base frame 10. A U-shaped clamp 164 has its legs pivoted at 165 to the stand 163 and has a manually operable clamp screw 166 in the cross member thereof for clamping the bracket 160 in proper position relative to the horn 20.

The second set of forming rolls 27 is arranged as shown in FIGURES 19, 22 and 23 with two roll assemblies 170 and 170', one on each side of the horn 20. The two assemblies 170 and 170' are of similar construction, being rights and lefts except for the number of rolls, the assembly 170 having one more roll than the assembly 170'. The assembly 170 comprises forming rolls 171, 172, 173, 174, 175, 176, 177 and 178, each having a generally concave peripheral surface and each having a slightly different surface configuration so as to progressively fold the blank side margins toward an overlapping relation around the bottom of the horn 20. The forming rolls are mounted on the inclined upper end of an upstanding bracket 180 which has a base plate 181 slidably mounted in a guide formation 182 at one side of an upstanding support bracket 183. A U-shaped clamp member 184 has its legs pivoted at 185 on the bracket 183 and carries a manually operable clamp screw 186 on the cross bar portion thereof for engaging the outside edge of the base plate 181 so as to removably clamp the bracket 180 in position. The roll assembly 170' is mounted in the same manner on the opposite side of the horn 20 and similar elements are indicated by the same numerals primed.

The leading end of the forming roll assembly 27 overlaps a pressure applying or seam forming apparatus 28 which extends beneath the horn and which completes the longitudinal seam. The seam forming apparatus 28 (FIGURES 24 to 27) is mounted on an upright stand 190 on the top 11 of the base frame 10. Three roll segments 191, 192 and 193 are supported on cross shafts 194, 195 and 196 for rotation in a slot formation 197 in the top of the frame 190. A fourth full roll 198 is mounted at the end of the slot 197 on a cross shaft 200. The shafts 194, 195, 196 and 200 carry gears 201, 202, 203 and 204 which are in toothed engagement with gears 205 and 206 mounted below the same on cross shafts 207 and 208. The two gears 207 and 208 are driven by engagement with a drive gear 210 on a cross shaft 211 which carries at its outer end a sprocket 212. The sprocket 212 is connected by drive chain 213 (FIGURE 2B) with the sprocket 214 on a cross drive shaft 215. The horn 20 has internal rolls 216 (FIGURES 26 and 27) spaced along the bottom face and operating in the slot 217 as back-up rolls for the pressure rolls 191, 192, 193 and 198. The segmental pressure rolls 191, 192 and 193 are timed to operate so as to lift the outside lap along its entire length simultaneously and to engage the entire length of the lap with the inside lap, the two laps being brought together with a parallel motion while the blank moves at constant velocity through the seam setting station. The three segmental rolls 191, 192 and 193 operate simultaneously to raise the outside lap into contact with the inside lap and to roll the seam. A final rolling of the seam is accomplished by the end roll 198.

As the fully formed tube advances beyond the roll 198 of the seam forming apparatus 28 it enters the reform station or device 30. The horn 20 carries an axially aligned extension 218 (FIGURES 29 to 31) which is canted upwardly to a slight degree and which is located above an endless belt conveyor 220, the latter being operated at a greater speed than the overhead conveyor 21 so as to accelerate the movement of the tube and clear the pusher means 24 on the overhead conveyor as it moves upwardly on the sprocket 121. The endless belt conveyor 220 is mounted on end support pulleys 221 and 222 with the top run extending, near the leading end thereof, between the rollers 223 and 224 which constitute the tube reform device 30. The horn extension 218 is provided with longitudinally spaced rolls 225, one roll 225 at the trailing end of the extension 218 being located at the entrance end of the conveyor 220 and another roll 225 at the leading end of the horn extension 218 being located between the reform rolls 223 and 224.

The reform rolls 223 and 224 are mounted on vertically spaced, parallel cross shafts 226 and 226' which are journaled at their opposite ends in upright side plates 227 and 227' forming an upright stand or frame for supporting the conveyor 220, the reforming device 30 and a portion of the discharge belt assembly 31. The shafts 225 and 226 carry at one end interengaging gears 228 and 230 and the lowermost gear 230 is driven by a gear 231 (FIGURE 2B) mounted on stub shaft 232 which is supported in suitable bearings on the upright frame member 227 and which carries at its outer end a sprocket 233. The sprocket 233 is connected by the chain 234 with the sprocket 235 on the cross drive shaft 236. The gear 231 also engages in driving relation gear 237 on the cross shaft 238 which carries the end support pulley 222 at the trailing end of the stripping conveyor 220. The reform rolls 223 and 224 have concave surfaces as shown in FIGURE 30 which partially collapse the tube body into the cross sectional shape defined between the curved surfaces of the reform rolls as shown in FIGURE 30 so as to remove the distortion resulting from the seam forming operation and to give the tube a true cylindrical shape when it is released and advances between a pair of laterally spaced belts 240 and 240' constituting the discharge conveyor 31 which extends beyond the reform device 30.

The belts 240 and 240' (FIGURES 2B and 28) of the discharge conveyor 31 are supported on vertically disposed end supporting rollers 241, 241' and 242, 242' so that the inner runs parallel each other in oppositely disposed relation. The end support rollers 242 and 242' are driven through a conventional belt drive 243 and a right angle gear box 244 from a cross drive shaft 245 which carries a sprocket 246 connected by the chain 247 with the sprocket 248 on the cross drive shaft 215. The drive belt 243 connects the drive pulley 250 (FIGURE 28) which is centered transversely of the machine with a pulley 251 on the bottom end of the vertical shaft 252 which carries the one belt roller 242' and with a pulley 253 on the bottom end of a short vertical shaft 254 which is journaled in a pivotally mounted support adjacent the bottom of the vertical shaft 255 for the belt roller 242. The shaft 254 carries a gear which engages with a gear on the bottom end of the shaft 255 so as to drive the belt roller 242. The belts 240 and 240' advance the tubes to an abutment stop member 256 (FIGURE 3B) which is positioned so that the leading edge of the tube strikes the same and the continued movement of the belts 240 and 240' causes the tube to turn 90° to an upright position for deposit on a conveyor, one end of which is indicated at 257 and which carries the tubes out of the machine.

Referring to FIGURES 2A and 2B, the motor 260 constitutes the main drive for the machine. It is supported in a suitable manner in the base 10 and connected with a main drive shaft 261 by a drive belt indicated at 262. The drive shaft 261 furnishes power to the various mechanisms. A sprocket 263 on the shaft 261 is connected by chain 264 with the sprocket 265 on the cross shaft 63' which furnishes power for the blank feeding conveyor 17 at the entrance end of the machine. The shaft 261 carries another sprocket 267 which is connected by the drive chain 268 with sprocket 270 on the cross shaft 271 and sprocket 272 on the cross shaft 273. The cross shaft 273 carries a sprocket 274 which is connected by the chain 275 with a sprocket 276 on the cross shaft 42 for operating the blank feed device. The shaft 271 carries a sprocket 277 which is connected by a chain 278 with a sprocket 280 on the drive shaft 84 for the preforming rolls. The main drive shaft 261 carries a further sprocket 281 which is connected by the chain 282 with a sprocket 283 on the drive shaft 236 and a sprocket 284 on the drive shaft 215. The drive shaft 236 carries a sprocket 285 which is connected by the chain 286 with a sprocket 287 on the cross shaft 123 for driving the overhead conveyor 21.

In operating the machine, a supply of blanks B is positioned in the magazine 12 from the bottom of which they are fed by the reciprocating feed lever 37 and advanced by conveyor 17 past the edge preforming rolls 74, 75 and 76, 77 to the overhead conveyor 21. The successive blanks are picked up by the pusher plates 24 on the initial forming blocks 23 and advanced along the horn 20. The blanks are initially formed to a slight curvature by engagement with the curved faces 134 and 139 of the blocks 22 and 23 on the conveyor 21. They are advanced past the heaters 145 and 146 which activate the adhesive on the seam forming surfaces of the blank margins. The forming roll assemblies 26 and 27 turn or fold the side margins of the blanks around the horn 20 as the blanks advance to a seam forming and pressing mechanism 28. The blank margin which forms the inside lap has been preformed so that it does not interfere with the opposite margin during folding. The segmental rolls of the seam forming and pressing mechanism are operated to lift the outside lap throughout its length and to press the same against the inside lap, with the back up rolls 216 in the horn 20 serving to insure adequate pressure is applied to the seam forming areas, and with the relative parallel movement of the lap forming portions of the blank eliminating any tendency of the same to skew or twist out of line. The final pressure roll 198 insures that the entire seam is rolled or pressed as the tube advances. The tube is stripped from the horn 20 and advanced ahead of the pushers 24 on the conveyor 21 by the accelerated movement imparted to it by the conveyor 220. Passage of the tube between the reforming rolls 223 and 224 removes any distortion due to the seam forming and results in a product having a uniform cross section. Finally, the finished tube is up ended as it is discharged from the conveyor 220 and delivered from the machine.

While particular materials and specific details of construction have been referred to in describing the illustrated mehod and machine, it will be understood that other materials and equivalent structural details may be resorted to within the spirit of the invention.

We claim:

1. An apparatus for forming a tubular container body from a blank of relatively thin flexible sheet material having a seal forming material on a side marginal portion which is adapted to be overlapped with the opposite side marginal portion so as to form a lapped seam, said apparatus comprising an elongate cylindrical forming mandrel disposed in a generally horizontal position, a blank supply magazine adjacent an entrance end of the mandrel, means for feeding successive blanks from the supply magazine, a blank advancing conveyor having means thereon for engaging the trailing edge of each successive blank and for advancing the same to said mandrel, means along the blank feed conveyor for bending a side margin of each successive blank to impart thereto a slight curvature, an overhead conveyor mounted on end supports which are disposed at opposite ends of said forming mandrel with the bottom run of the conveyor traveling in a generally parallel path immediately above the top surface of the mandrel, spaced blocks on said overhead conveyor having outwardly facing curved surfaces conforming generally to the curvature of said mandrel and means resiliently mounted on said blocks for engaging the trailing edge of each successive blank as it is advanced to the leading end of the blank feed conveyor and for advancing said blank along the top surface of said mandrel, the curved faces of said blocks serving to preliminarily shape each successive blank and start the folding thereof about the top surface of the mandrel, heating means adjacent the mandrel for activating the seal forming material on the blank, shaping rolls mounted adjacent the opposite sides of the mandrel for progressively folding the side portions of each blank about the mandrel so as to overlap the side margins of the blank and form the same into a tube, means associated with the mandrel for bringing the outermost side margin of the blank into lap seam forming engagement with the innermost margin thereof by engaging said outermost margin at a plurality of longitudinally spaced points and applying pressure simultaneously along the length of the seam, means for stripping the tube from the mandrel and means for immediately pressing the walls of the tube to give the tube a temporary, generally ellipsoidal cross section and thereafter releasing the same to permit it to assume a final cylindrical shape with a substantially uniform diameter.

2. An apparatus for forming a tubular container body from a blank of relatively thin flexible sheet material which has a heat activatable seal forming material on a side marginal portion which is adapted to be overlapped with the opposite side marginal portion so as to form a lapped seam, said apparatus comprising an elongate cylindrical forming mandrel disposed in a generally horizontal position, a blank supply magazine adjacent an entrance end of the mandrel, means for feeding successive blanks from the supply magazine and advancing each successive blank to said mandrel, means for bending a side edge margin of each successive blank to impart thereto a slight curvature, an overhead conveyor mounted on end supports which are disposed at opposite ends of said forming mandrel with the bottom run of the conveyor traveling in a parallel path immediately above the top surface of the mandrel, blank engaging means on said overhead conveyor conforming generally to the curvature of said mandrel and resiliently engaging the trailing edge of each successive blank as it is advanced to the leading end of the blank feed conveyor and for advancing said blank along the top surface of said mandrel, heating means along the mandrel for activating the seal forming material on the blank, forming rolls mounted adjacent the opposite sides of the mandrel for progressively folding the side portions of the blank about the mandrel so as to overlap the same and form the blank into a tube, means associated with the mandrel for applying pressure to the outermost side margin thereof simultaneously at a plurality of longitudinally spaced points along the length of the tube, means for stripping the tube from the mandrel and means for immediately shaping the walls of the tube to give the tube a generally ellipsoidal cross section and then releasing the same to permit it to assume a final cylindrical cross section with a substantially uniform diameter.

3. An apparatus for forming a tubular container body from a blank of relatively thin flexible sheet material which has a sealing material on a side marginal portion which is adapted to be overlapped with the opposite side marginal portion and pressed so as to form a lapped seam, said apparatus comprising an elongate cylindrical forming mandrel disposed in a generally horizontal position, a blank supply means adjacent an entrance end of the mandrel, means for feeding successive blanks from the supply means and advancing the same to said mandrel, means along the blank feeding means for preliminarily bending a side edge margin of each successive blank to impart thereto a slight curvature, an overhead blank feed conveyor mounted on end supports which are disposed at opposite ends of said forming mandrel with a run of the conveyor traveling in a parallel path immediately above the top surface of the mandrel, means on said overhead conveyor for engaging the trailing edge of each successive blank as it is advanced to the leading end of the blank feeding means and for continuously advancing said blank along the top surface of said mandrel, heating means along the mandrel for activating the sealing material on the blank, forming rolls mounted adjacent the opposite sides of the mandrel for progressively folding the side portions of the blank about the mandrel so as to overlap the side margins and form the blank into a tube, and means associated with the mandrel for bringing the outermost side margin of the blank into lap seam forming engagement with the innermost side margin of the blank by simultaneous engagement thereof at a plurality of longitudinally spaced points and by application of pressure simultaneously along the length of the tube.

4. An apparatus for forming a tubular container body from a generally rectangular blank of relatively thin, flexible material having a heat sealable surface, said apparatus comprising in combination an elongate cylindrical forming mandrel mounted in a generally horizontal position, a blank supply magazine adjacent an entrance end of the mandrel, means for feeding successive blanks from the supply magazine and advancing the same to said mandrel, means for engaging a side margin of each successive blank and imparting thereto a slight downward and inward curvature, an overhead conveyor mounted on end supports disposed at opposite ends of said mandrel so that the bottom run of the conveyor travels in a path immediately above the top surface of the mandrel, spaced blocks on said overhead conveyor having outwardly facing surfaces conforming substantially to the curvature of the top surface of said mandrel and resiliently mounted fingers thereon for engaging the trailing edges of successive blanks as they are advanced to the entrance end of the mandrel and for continuously advancing said blanks along the top surface of said mandrel, the curved faces of said blocks serving to preliminarily shape the blanks and start the folding thereof about the mandrel, heating means disposed along the mandrel for activating the heat sealable surface of the blanks, folding devices for progressively folding the side portions of the blank about the sides and bottom of the mandrel so as to form the blank into a tube with overlapping seam forming side margins, means associated with the mandrel for bringing the outermost side margin into lapped seam forming position against the innermost margin by simultaneous engagement of a plurality of longitudinally spaced pressure applying members at a plurality of points along the length of the tube, means for stripping the tube from the mandrel and means for immediately pressing inwardly portions of the walls of the tube so as to flex the same and momentarily give it a generally ellipsoidal cross section and thereafter releasing the same to permit it to assume a final cylindrical shape of uniform diameter.

27. An apparatus as recited in claim 26, and said forming mandrel having longitudinally extending, peripherally spaced grooves for accommodating the outwardly projecting lug formations during the travel of the associated forming block along said mandrel.

28. An apparatus as recited in claim 26, and said forming blocks which carry the pusher means having spring means urging them in a forward direction so as to engage the associated pusher means with the trailing edges of the blanks with resilient pressure.

29. An apparatus for forming tubular container bodies from blanks of relatively thin flexible sheet material, said apparatus comprising an elongate cylindrical forming mandrel disposed in a generally horizontal position, a blank supply means, means for feeding successive blanks from the supply means and advancing the same to said mandrel, an overhead blank feeding and forming conveyor mounted on end supports which are disposed at opposite ends of said forming mandrel with a bottom run of the conveyor traveling in a generally parallel path immediately above the top surface of the mandrel, forming blocks on said overhead conveyor having concave surfaces on outboard faces thereof for engaging and preliminarily shaping the topmost face of each successive blank as it is advanced to the receiving end of the forming mandrel, certain of said blocks being pivotally mounted on said chain, and means for pushing each said blank along the top surface of said mandrel while it is formed into a tube about the mandrel.

30. In an apparatus for feeding blanks from the bottom of a vertically disposed stack, a pivotally mounted arm disposed below the bottom of the stack and having a feeding head movable in a path to sweep across the bottom of the stack with a ledge thereon for engaging an edge of the lowermost blank in the stack so as to feed the blanks in single file from the stack, means for lifting the stack above the path of the blank engaging ledge so as to prevent feeding of the bottom blank, and timing means for operating said stack lifting means so as to control the feeding of the blanks.

31. A method of fabricating from blanks of flexible sheet material open ended tubes which are suitable for use as container bodies, which comprises initially bending a side marginal portion of each blank which subsequently forms part of a longitudinally lapped seam portion so that it does not interfere with the movement of the opposite edge of the blank when the side edges are moved past each other during subsequent folding operations, advancing the blank to a tubular forming mandrel while at the same time initially folding the center portion of the blank in a direction to form the blank into a tubular shape about the mandrel, advancing the partially folded blank along the forming mandrel while progressively folding the sides of the blank about the sides of the mandrel so as to bring adhesive bearing seam forming portions of the side margins of the blank into generally parallel overlying relation, moving the outer most seam forming portion into engagement with the innermost seam forming portion while said seam forming portions are substantially parallel, applying pressure along the length of the seam forming portions so as to set the adhesive and relieving the stresses in the walls of the seamed tube by passing the tube through a passageway which has a generally ellipsoidal cross section so as to give the tube a temporary ellipsoidal cross section which enables the tube, when released, to assume a final cylindrical shape with a substantially uniform diameter.

32. In a method of fabricating from blanks of flexible sheet material open ended tubular members suitable for use as container bodies wherein successive blanks are folded about a cylindrical forming mandrel and the side margins are overlapped and secured in seam forming relation, the step of initially bending one side margin of the blank, which subsequently is folded to lie beneath the opposite side margin in the seam forming area, so as to impart to said side margin prior to the folding of the body of the blank, an initial curvature sufficient to avoid interference with the opposite side edge of the blank when the blank is subsequently folded into a tube around the mandrel and the side margins are moved past each other so as to bring them into overlapping seam forming relation.

33. In a method of fabricating open ended tubular container bodies from blanks of flexible sheet material wherein successive blanks are folded about a cylindrical forming horn and opposite side margins are overlapped and secured in seam forming relation by the application thereto of heat and pressure sufficient to activate and set adhesive material between the laps in the seam area, the step of reforming the seamed tube by forcing it into a generally ellipsoidal cross section and then releasing the tube to permit the tube walls to assume a final cylindrical shape and having a substantially uniform diameter.

34. In a method of fabricating open ended tubular container bodies from blanks of flexible sheet material, such as paperboard, wherein successive blanks are folded about a cylindrical forming horn and opposite side margins are overlapped and secured in seam forming relation by the application thereto of heat and pressure sufficient to activate and set adhesive material in the seam area between the overlapped side margins, the step of reshaping the seamed tube to relieve stresses therein resulting from the forming and sealing operations by passing the tube through a passageway having a generally ellipsoidal cross section and permitting the tube walls to assume a final position providing the tube with a final cylindrical shape and having a substantially uniform diameter.

35. A method of fabricating from blanks of flexible sheet material open ended tubes which are suitable for use as container bodies, which comprises initially bending a side marginal portion of each blank which subsequently forms the inner lap of a longitudinal seam portion so that it does not interfere with the movement of the opposite margin of the blank during subsequent folding operations when the two side edge portions are moved past each other, advancing the blank to the entrance end of a tubular forming mandrel while simultaneously initially folding the blank in a direction to form it into a tubular shape, advancing the partially folded blank along the forming mandrel while progressively folding the sides of the blank about the sides of the mandrel so as to bring adhesive bearing seam forming marginal portions of the blank into parallel overlapping relation, moving the outermost seam forming portion into engagement with the innermost seam forming portion while said seam forming portions are parallel, applying pressure throughout the length thereof to the seam forming portions so as to set the adhesive and reforming the seamed tube by pressing on the walls of the tube to give the tube a temporary ellipsoidal cross section and thereafter releasing the tube to permit the tube to assume a final cylindrical shape with a substantially uniform diameter.

References Cited
UNITED STATES PATENTS

| | | | |
|---|---|---|---|
| 2,521,007 | 9/1950 | Heinmets | 93—82 |
| 2,915,952 | 12/1959 | O'Neil | 93—82 |
| 2,935,919 | 5/1960 | O'Neil | 93—82 |
| 3,139,012 | 6/1964 | Senfleben | 93—82 |

BERNARD STICKNEY, *Primary Examiner.*

27. An apparatus as recited in claim 26, and said forming mandrel having longitudinally extending, peripherally spaced grooves for accommodating the outwardly projecting lug formations during the travel of the associated forming block along said mandrel.

28. An apparatus as recited in claim 26, and said forming blocks which carry the pusher means having spring means urging them in a forward direction so as to engage the associated pusher means with the trailing edges of the blanks with resilient pressure.

29. An apparatus for forming tubular container bodies from blanks of relatively thin flexible sheet material, said apparatus comprising an elongate cylindrical forming mandrel disposed in a generally horizontal position, a blank supply means, means for feeding successive blanks from the supply means and advancing the same to said mandrel, an overhead blank feeding and forming conveyor mounted on end supports which are disposed at opposite ends of said forming mandrel with a bottom run of the conveyor traveling in a generally parallel path immediately above the top surface of the mandrel, forming blocks on said overhead conveyor having concave surfaces on outboard faces thereof for engaging and preliminarily shaping the topmost face of each successive blank as it is advanced to the receiving end of the forming mandrel, certain of said blocks being pivotally mounted on said chain, and means for pushing each said blank along the top surface of said mandrel while it is formed into a tube about the mandrel.

30. In an apparatus for feeding blanks from the bottom of a vertically disposed stack, a pivotally mounted arm disposed below the bottom of the stack and having a feeding head movable in a path to sweep across the bottom of the stack with a ledge thereon for engaging an edge of the lowermost blank in the stack so as to feed the blanks in single file from the stack, means for lifting the stack above the path of the blank engaging ledge so as to prevent feeding of the bottom blank, and timing means for operating said stack lifting means so as to control the feeding of the blanks.

31. A method of fabricating from blanks of flexible sheet material open ended tubes which are suitable for use as container bodies, which comprises initially bending a side marginal portion of each blank which subsequently forms part of a longitudinally lapped seam portion so that it does not interfere with the movement of the opposite edge of the blank when the side edges are moved past each other during subsequent folding operations, advancing the blank to a tubular forming mandrel while at the same time initially folding the center portion of the blank in a direction to form the blank into a tubular shape about the mandrel, advancing the partially folded blank along the forming mandrel while progressively folding the sides of the blank about the sides of the mandrel so as to bring adhesive bearing seam forming portions of the side margins of the blank into generally parallel overlying relation, moving the outer most seam forming portion into engagement with the innermost seam forming portion while said seam forming portions are substantially parallel, applying pressure along the length of the seam forming portions so as to set the adhesive and relieving the stresses in the walls of the seamed tube by passing the tube through a passageway which has a generally ellipsoidal cross section so as to give the tube a temporary ellipsoidal cross section which enables the tube, when released, to assume a final cylindrical shape with a substantially uniform diameter.

32. In a method of fabricating from blanks of flexible sheet material open ended tubular members suitable for use as container bodies wherein successive blanks are folded about a cylindrical forming mandrel and the side margins are overlapped and secured in seam forming relation, the step of initially bending one side margin of the blank, which subsequently is folded to lie beneath the opposite side margin in the seam forming area, so as to impart to said side margin prior to the folding of the body of the blank, an initial curvature sufficient to avoid interference with the opposite side edge of the blank when the blank is subsequently folded into a tube around the mandrel and the side margins are moved past each other so as to bring them into overlapping seam forming relation.

33. In a method of fabricating open ended tubular container bodies from blanks of flexible sheet material wherein successive blanks are folded about a cylindrical forming horn and opposite side margins are overlapped and secured in seam forming relation by the application thereto of heat and pressure sufficient to activate and set adhesive material between the laps in the seam area, the step of reforming the seamed tube by forcing it into a generally ellipsoidal cross section and then releasing the tube to permit the tube walls to assume a final cylindrical shape and having a substantially uniform diameter.

34. In a method of fabricating open ended tubular container bodies from blanks of flexible sheet material, such as paperboard, wherein successive blanks are folded about a cylindrical forming horn and opposite side margins are overlapped and secured in seam forming relation by the application thereto of heat and pressure sufficient to activate and set adhesive material in the seam area between the overlapped side margins, the step of reshaping the seamed tube to relieve stresses therein resulting from the forming and sealing operations by passing the tube through a passageway having a generally ellipsoidal cross section and permitting the tube walls to assume a final position providing the tube with a final cylindrical shape and having a substantially uniform diameter.

35. A method of fabricating from blanks of flexible sheet material open ended tubes which are suitable for use as container bodies, which comprises initially bending a side marginal portion of each blank which subsequently forms the inner lap of a longitudinal seam portion so that it does not interfere with the movement of the opposite margin of the blank during subsequent folding operations when the two side edge portions are moved past each other, advancing the blank to the entrance end of a tubular forming mandrel while simultaneously initially folding the blank in a direction to form it into a tubular shape, advancing the partially folded blank along the forming mandrel while progressively folding the sides of the blank about the sides of the mandrel so as to bring adhesive bearing seam forming marginal portions of the blank into parallel overlapping relation, moving the outermost seam forming portion into engagement with the innermost seam forming portion while said seam forming portions are parallel, applying pressure throughout the length thereof to the seam forming portions so as to set the adhesive and reforming the seamed tube by pressing on the walls of the tube to give the tube a temporary ellipsoidal cross section and thereafter releasing the tube to permit the tube to assume a final cylindrical shape with a substantially uniform diameter.

References Cited
UNITED STATES PATENTS

| | | | |
|---|---|---|---|
| 2,521,007 | 9/1950 | Heinmets | 93—82 |
| 2,915,952 | 12/1959 | O'Neil | 93—82 |
| 2,935,919 | 5/1960 | O'Neil | 93—82 |
| 3,139,012 | 6/1964 | Senfleben | 93—82 |

BERNARD STICKNEY, *Primary Examiner.*

UNITED STATES PATENT OFFICE
CERTIFICATE OF CORRECTION

Patent No. 3,338,142　　　　　　　　Dated August 29, 1967

Inventor(s) Justin Simpson et al

It is certified that error appears in the above-identified patent and that said Letters Patent are hereby corrected as shown below:

Column 15, line 2, cancel "remove" and insert
-- move --.

Signed and sealed this 25th day of August 1970.

(SEAL)
Attest:

EDWARD M. FLETCHER, JR.　　　　　　WILLIAM E. SCHUYLER, JR.
Attesting Officer　　　　　　　　　Commissioner of Patents